(12) United States Patent
Gallagher et al.

(10) Patent No.: US 8,165,086 B2
(45) Date of Patent: Apr. 24, 2012

(54) METHOD OF PROVIDING IMPROVED INTEGRATED COMMUNICATION SYSTEM DATA SERVICE

(75) Inventors: Michael D. Gallagher, San Jose, CA (US); Patrick Tao, San Jose, CA (US); Milan Markovic, Pleasanton, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 1123 days.

(21) Appl. No.: 11/737,128

(22) Filed: Apr. 18, 2007

(65) Prior Publication Data

US 2007/0243872 A1 Oct. 18, 2007

Related U.S. Application Data

(60) Provisional application No. 60/793,196, filed on Apr. 18, 2006.

(51) Int. Cl.
*H04W 4/00* (2009.01)
(52) U.S. Cl. ..... 370/331; 370/328; 370/338; 455/414.1; 455/424; 455/425
(58) Field of Classification Search .......... 370/331, 370/328, 338; 455/414.1, 424, 425
See application file for complete search history.

(56) References Cited

U.S. PATENT DOCUMENTS

| 5,014,197 A | 5/1991 | Wolf |
| 5,101,501 A | 3/1992 | Gilhousen et al. |
| 5,109,528 A | 4/1992 | Uddenfeldt |
| 5,226,045 A | 7/1993 | Chuang |
| 5,235,632 A | 8/1993 | Raith |
| 5,260,944 A | 11/1993 | Tomabechi |
| 5,260,988 A | 11/1993 | Schellinger et al. |
| 5,267,261 A | 11/1993 | Blakeney, II et al. |
| 5,367,558 A | 11/1994 | Gillig et al. |
| 5,390,233 A | 2/1995 | Jensen et al. |
| 5,392,331 A | 2/1995 | Patsiokas et al. |
| 5,406,615 A | 4/1995 | Miller, II et al. |
| 5,428,601 A | 6/1995 | Owen |
| 5,442,680 A | 8/1995 | Schellinger |
| 5,448,619 A | 9/1995 | Evans et al. |
| 5,507,035 A | 4/1996 | Bantz et al. |
| 5,533,027 A | 7/1996 | Akerberg et al. |
| 5,594,782 A | 1/1997 | Zicker et al. |

(Continued)

FOREIGN PATENT DOCUMENTS

EP 0936777 8/1999

(Continued)

OTHER PUBLICATIONS

U.S. Appl. No. 11/110,222, filed Apr. 20, 2005, Gallagher, Michael, et al.

(Continued)

*Primary Examiner* — Nghi Ly
(74) *Attorney, Agent, or Firm* — Adeli & Tollen LLP

(57) ABSTRACT

Some embodiments provide a method and apparatus for seamlessly providing voice and data services across a licensed wireless network while accessing a second different communication network through a user equipment. The first and second communication networks include licensed wireless networks, unlicensed wireless networks, or Internet Protocol (IP) networks, to name a few. Furthermore, some embodiments of the second communication network include a modified interface for directly interfacing with components of the first communication network in order to pass and retrieve data packets from the user equipment.

12 Claims, 10 Drawing Sheets

U.S. PATENT DOCUMENTS

| | | | |
|---|---|---|---|
| 5,610,969 A | 3/1997 | McHenry et al. | |
| 5,634,193 A | 5/1997 | Ghisler | |
| 5,640,414 A | 6/1997 | Blakeney, II et al. | |
| 5,659,598 A | 8/1997 | Byrne et al. | |
| 5,659,878 A | 8/1997 | Uchida et al. | |
| 5,664,005 A | 9/1997 | Emery et al. | |
| 5,673,307 A | 9/1997 | Holland et al. | |
| 5,675,629 A | 10/1997 | Raffel et al. | |
| 5,724,658 A | 3/1998 | Hasan | |
| 5,732,076 A | 3/1998 | Ketseoglou et al. | |
| 5,745,852 A | 4/1998 | Khan et al. | |
| 5,758,281 A | 5/1998 | Emery et al. | |
| 5,796,727 A | 8/1998 | Harrison | |
| 5,796,729 A | 8/1998 | Greaney | |
| 5,815,525 A | 9/1998 | Smith et al. | |
| 5,818,820 A | 10/1998 | Anderson | |
| 5,822,681 A | 10/1998 | Chang et al. | |
| 5,822,767 A | 10/1998 | MacWilliams et al. | |
| 5,825,759 A | 10/1998 | Liu | |
| 5,852,767 A | 12/1998 | Sugita | |
| 5,870,677 A | 2/1999 | Takahashi et al. | |
| 5,887,020 A | 3/1999 | Smith | |
| 5,887,260 A | 3/1999 | Nakata | |
| 5,890,055 A | 3/1999 | Chu | |
| 5,890,064 A | 3/1999 | Widergen | |
| 5,903,834 A | 5/1999 | Wallstedt | |
| 5,915,224 A | 6/1999 | Jonsson | |
| 5,926,760 A | 7/1999 | Khan | |
| 5,936,949 A | 8/1999 | Pasternak | |
| 5,940,512 A | 8/1999 | Tomoike | |
| 5,946,622 A | 8/1999 | Bojeryd | |
| 5,949,773 A | 9/1999 | Bhalla et al. | |
| 5,960,341 A | 9/1999 | LeBlanc et al. | |
| 5,995,500 A | 11/1999 | Ma et al. | |
| 5,995,828 A | 11/1999 | Nishida | |
| 6,016,318 A | 1/2000 | Tomoike | |
| 6,035,193 A | 3/2000 | Buhrmann | |
| 6,052,592 A | 4/2000 | Schellinger | |
| 6,101,176 A | 8/2000 | Honkasalo et al. | |
| 6,112,080 A | 8/2000 | Anderson | |
| 6,112,088 A | 8/2000 | Haartsen | |
| 6,119,000 A | 9/2000 | Stephenson et al. | |
| 6,130,886 A | 10/2000 | Ketseoglou | |
| 6,134,227 A | 10/2000 | Magana | |
| 6,138,019 A | 10/2000 | Trompower | |
| 6,167,279 A | 12/2000 | Chang et al. | |
| 6,226,515 B1 | 5/2001 | Pauli et al. | |
| 6,236,852 B1 | 5/2001 | Veerasamy et al. | |
| 6,243,581 B1 | 6/2001 | Jawanda | |
| 6,256,511 B1 | 7/2001 | Brown et al. | |
| 6,263,211 B1 | 7/2001 | Brunner | |
| 6,269,086 B1 | 7/2001 | Magana | |
| 6,320,873 B1 | 11/2001 | Nevo | |
| 6,327,470 B1 | 12/2001 | Ostling | |
| 6,359,872 B1 | 3/2002 | Mahany et al. | |
| 6,374,102 B1 | 4/2002 | Brachman | |
| 6,381,457 B1 | 4/2002 | Carlsson et al. | |
| 6,389,059 B1 | 5/2002 | Smith et al. | |
| 6,393,007 B1 | 5/2002 | Haartsen | |
| 6,415,158 B1 | 7/2002 | King | |
| 6,415,410 B1 | 7/2002 | Kanerva et al. | |
| 6,430,395 B2 | 8/2002 | Arazi et al. | |
| 6,434,389 B1 | 8/2002 | Meskanen et al. | |
| 6,445,921 B1 | 9/2002 | Bell | |
| 6,463,307 B1 | 10/2002 | Larsson et al. | |
| 6,539,237 B1 | 3/2003 | Sayers et al. | |
| 6,542,516 B1 | 4/2003 | Vialen et al. | |
| 6,553,219 B1 | 4/2003 | Vilander et al. | |
| 6,556,822 B1 | 4/2003 | Matsumoto | |
| 6,556,825 B1 | 4/2003 | Mansfield | |
| 6,556,830 B1 | 4/2003 | Lenzo | |
| 6,574,266 B1 | 6/2003 | Haartsen | |
| 6,587,444 B1 | 7/2003 | Lenzo | |
| 6,633,761 B1 | 10/2003 | Singhal | |
| 6,643,512 B1 | 11/2003 | Ramaswamy | |
| 6,647,426 B2 | 11/2003 | Mohammed | |
| 6,654,589 B1 * | 11/2003 | Haumont | 455/67.11 |
| 6,654,610 B1 | 11/2003 | Chen et al. | |
| 6,658,250 B1 | 12/2003 | Ganesan | |
| 6,665,276 B1 | 12/2003 | Culbertson | |
| 6,675,009 B1 | 1/2004 | Cook | |
| 6,680,923 B1 | 1/2004 | Leon | |
| 6,683,853 B1 | 1/2004 | Kannas et al. | |
| 6,711,400 B1 | 3/2004 | Aura | |
| 6,766,160 B1 | 7/2004 | Lemilainen et al. | |
| 6,785,535 B2 | 8/2004 | Lucidarme et al. | |
| 6,788,656 B1 | 9/2004 | Smolentzov | |
| 6,801,519 B1 | 10/2004 | Mangel | |
| 6,801,772 B1 | 10/2004 | Townend et al. | |
| 6,801,777 B2 | 10/2004 | Rusch | |
| 6,807,417 B2 | 10/2004 | Sallinen et al. | |
| 6,823,154 B2 | 11/2004 | Koga et al. | |
| 6,824,048 B1 | 11/2004 | Itabashi | |
| 6,826,154 B2 | 11/2004 | Subbiah et al. | |
| 6,829,227 B1 | 12/2004 | Pitt | |
| 6,839,356 B2 | 1/2005 | Barany et al. | |
| 6,842,462 B1 | 1/2005 | Ramjee et al. | |
| 6,842,621 B2 | 1/2005 | Labun et al. | |
| 6,845,095 B2 | 1/2005 | Krishnarajah et al. | |
| 6,850,503 B2 | 2/2005 | Dorenbosch et al. | |
| 6,853,851 B1 | 2/2005 | Rautiola et al. | |
| 6,879,568 B1 | 4/2005 | Xu et al. | |
| 6,895,255 B1 | 5/2005 | Bridgelall | |
| 6,909,705 B1 | 6/2005 | Lee et al. | |
| 6,910,074 B1 | 6/2005 | Amin et al. | |
| 6,922,559 B2 | 7/2005 | Mohammed | |
| 6,925,074 B1 | 8/2005 | Vikberg et al. | |
| 6,937,862 B2 | 8/2005 | Back et al. | |
| 6,970,719 B1 | 11/2005 | McConnell et al. | |
| 6,993,359 B1 | 1/2006 | Nelakanti | |
| 7,009,952 B1 | 3/2006 | Razavilar et al. | |
| 7,028,186 B1 | 4/2006 | Stenman et al. | |
| 7,039,025 B1 | 5/2006 | Menon et al. | |
| 7,065,353 B1 | 6/2006 | Bolinth et al. | |
| 7,069,022 B2 | 6/2006 | Rajaniemi et al. | |
| 7,092,370 B2 | 8/2006 | Jiang et al. | |
| 7,099,339 B1 | 8/2006 | Wang et al. | |
| 7,107,055 B2 | 9/2006 | Gallagher et al. | |
| 7,127,250 B2 | 10/2006 | Gallagher et al. | |
| 7,171,205 B2 | 1/2007 | Gallagher et al. | |
| 7,197,309 B2 | 3/2007 | Gallagher et al. | |
| 7,200,112 B2 | 4/2007 | Sundar et al. | |
| 7,200,383 B2 | 4/2007 | Eronen | |
| 7,200,399 B2 | 4/2007 | Gallagher et al. | |
| 7,209,744 B2 | 4/2007 | Gallagher et al. | |
| 7,212,819 B2 | 5/2007 | Gallagher et al. | |
| 7,215,961 B2 | 5/2007 | Gallagher et al. | |
| 7,231,046 B1 | 6/2007 | Einola et al. | |
| 7,245,916 B2 | 7/2007 | Gallagher et al. | |
| 7,251,227 B2 | 7/2007 | de Jong et al. | |
| 7,272,397 B2 | 9/2007 | Gallagher et al. | |
| 7,283,821 B2 | 10/2007 | Gallagher et al. | |
| 7,283,822 B2 | 10/2007 | Gallagher et al. | |
| 7,308,263 B2 | 12/2007 | Gallagher et al. | |
| 7,324,818 B2 | 1/2008 | Gallagher et al. | |
| 7,349,698 B2 | 3/2008 | Gallagher et al. | |
| 7,369,854 B2 | 5/2008 | Gallagher et al. | |
| 7,369,859 B2 | 5/2008 | Gallagher | |
| 7,420,964 B2 | 9/2008 | Narvanen et al. | |
| 7,433,675 B2 | 10/2008 | Lucidarme et al. | |
| 7,441,043 B1 | 10/2008 | Henry et al. | |
| 7,454,207 B2 | 11/2008 | Gallagher et al. | |
| 7,471,655 B2 | 12/2008 | Gallagher et al. | |
| 7,580,424 B2 * | 8/2009 | Ravishankar et al. | 370/468 |
| 7,606,190 B2 | 10/2009 | Markovic et al. | |
| 7,640,036 B2 * | 12/2009 | Kallio | 455/552.1 |
| 7,684,803 B2 | 3/2010 | Gallagher et al. | |
| 7,769,379 B2 | 8/2010 | Suumäki et al. | |
| 7,769,385 B2 | 8/2010 | Gallagher et al. | |
| 7,773,993 B2 | 8/2010 | Gallagher et al. | |
| 7,852,817 B2 | 12/2010 | Gallagher et al. | |
| 7,912,004 B2 | 3/2011 | Gallagher et al. | |
| 7,957,348 B1 | 6/2011 | Gallagher et al. | |
| 7,974,270 B2 | 7/2011 | Goel et al. | |
| 8,005,076 B2 | 8/2011 | Gallagher et al. | |
| 2001/0029186 A1 | 10/2001 | Canyon et al. | |
| 2001/0031645 A1 | 10/2001 | Jarrett | |

| | | | | | | |
|---|---|---|---|---|---|---|
| 2001/0046860 A1 | 11/2001 | Lee | | 2004/0072593 A1 | 4/2004 | Robbins et al. |
| 2001/0049790 A1 | 12/2001 | Faccin et al. | | 2004/0077355 A1 | 4/2004 | Krenik et al. |
| 2001/0055298 A1 | 12/2001 | Baker et al. | | 2004/0077356 A1 | 4/2004 | Krenik et al. |
| 2002/0009199 A1 | 1/2002 | Ala-Laurila et al. | | 2004/0077374 A1 | 4/2004 | Terry |
| 2002/0032030 A1 | 3/2002 | Berglund et al. | | 2004/0087307 A1 | 5/2004 | Ibe et al. |
| 2002/0036983 A1 | 3/2002 | Widegren et al. | | 2004/0087319 A1 | 5/2004 | Bos |
| 2002/0045459 A1 | 4/2002 | Morikawa | | 2004/0147223 A1 | 7/2004 | Cho |
| 2002/0051463 A1 | 5/2002 | Higuchi | | 2004/0171378 A1 | 9/2004 | Rautila |
| 2002/0059516 A1 | 5/2002 | Turtiainen et al. | | 2004/0202132 A1 | 10/2004 | Heinonen et al. |
| 2002/0065099 A1 | 5/2002 | Bjorndahl | | 2004/0203346 A1 | 10/2004 | Myhre et al. |
| 2002/0066036 A1 | 5/2002 | Makineni | | 2004/0203737 A1 | 10/2004 | Myhre et al. |
| 2002/0075844 A1 | 6/2002 | Hagen | | 2004/0203800 A1 | 10/2004 | Myhre et al. |
| 2002/0080797 A1 | 6/2002 | Kim | | 2004/0203815 A1 | 10/2004 | Shoemake et al. |
| 2002/0082015 A1 | 6/2002 | Wu | | 2004/0240525 A1 | 12/2004 | Karabinis et al. |
| 2002/0085516 A1 | 7/2002 | Bridgelall | | 2005/0002407 A1 | 1/2005 | Shaheen et al. |
| 2002/0086682 A1 | 7/2002 | Naghian | | 2005/0041787 A1 | 2/2005 | Casey et al. |
| 2002/0095599 A1 | 7/2002 | Hong et al. | | 2005/0064896 A1 | 3/2005 | Rautiola et al. |
| 2002/0101848 A1 | 8/2002 | Lee et al. | | 2005/0070288 A1 | 3/2005 | Belkin et al. |
| 2002/0102974 A1 | 8/2002 | Raith | | 2005/0101245 A1 | 5/2005 | Ahmavaara |
| 2002/0114322 A1 | 8/2002 | Xu et al. | | 2005/0101329 A1 | 5/2005 | Gallagher |
| 2002/0118674 A1 | 8/2002 | Faccin et al. | | 2005/0111409 A1 | 5/2005 | Spear et al. |
| 2002/0120749 A1 | 8/2002 | Widegren et al. | | 2005/0130659 A1 | 6/2005 | Grech et al. |
| 2002/0123325 A1 | 9/2002 | Cooper | | 2005/0144647 A1 | 6/2005 | Zussman et al. |
| 2002/0131387 A1 | 9/2002 | Pitcher et al. | | 2005/0160161 A1 | 7/2005 | Barrett et al. |
| 2002/0131396 A1 | 9/2002 | Knuutila et al. | | 2005/0186948 A1 | 8/2005 | Gallagher et al. |
| 2002/0132630 A1 | 9/2002 | Arazi et al. | | 2005/0198199 A1 | 9/2005 | Dowling |
| 2002/0141393 A1 | 10/2002 | Eriksson et al. | | 2005/0198306 A1 | 9/2005 | Palojarvi et al. |
| 2002/0142761 A1 | 10/2002 | Wallstedt et al. | | 2005/0207395 A1 | 9/2005 | Mohammed |
| 2002/0143874 A1 | 10/2002 | Marquette et al. | | 2005/0239441 A1 | 10/2005 | Eronen |
| 2002/0147008 A1 | 10/2002 | Kallio | | 2005/0250522 A1 | 11/2005 | Gilbert |
| 2002/0147016 A1 | 10/2002 | Arazi et al. | | 2005/0255879 A1 | 11/2005 | Shi et al. |
| 2002/0150091 A1 | 10/2002 | Lopponen et al. | | 2005/0265279 A1 | 12/2005 | Markovic et al. |
| 2002/0155829 A1 | 10/2002 | Proctor, Jr. et al. | | 2005/0266853 A1 | 12/2005 | Gallagher et al. |
| 2002/0160811 A1 | 10/2002 | Jannette et al. | | 2005/0271008 A1 | 12/2005 | Gallagher et al. |
| 2002/0161905 A1 | 10/2002 | Haverinen et al. | | 2005/0272425 A1 | 12/2005 | Amerga et al. |
| 2002/0166068 A1 | 11/2002 | Kilgore | | 2005/0272449 A1 | 12/2005 | Gallagher et al. |
| 2002/0172209 A1 | 11/2002 | Ohta et al. | | 2005/0286466 A1 | 12/2005 | Tagg et al. |
| 2002/0174335 A1 | 11/2002 | Zhang et al. | | 2006/0009202 A1 | 1/2006 | Gallagher et al. |
| 2002/0191556 A1 | 12/2002 | Krishnarajah et al. | | 2006/0019657 A1 | 1/2006 | Gallagher et al. |
| 2002/0191575 A1 | 12/2002 | Kalavade et al. | | 2006/0019658 A1 | 1/2006 | Gallagher et al. |
| 2002/0197984 A1 | 12/2002 | Monin et al. | | 2006/0019667 A1 | 1/2006 | Hicks, III |
| 2003/0007475 A1 | 1/2003 | Tsuda et al. | | 2006/0021036 A1 | 1/2006 | Chang et al. |
| 2003/0018480 A1 | 1/2003 | Mecayten | | 2006/0050667 A1* | 3/2006 | Verma et al. .................. 370/338 |
| 2003/0026269 A1 | 2/2003 | Paryani | | 2006/0063544 A1 | 3/2006 | Zhao et al. |
| 2003/0031151 A1 | 2/2003 | Sharma et al. | | 2006/0075073 A1 | 4/2006 | Bichot |
| 2003/0043773 A1 | 3/2003 | Chang | | 2006/0094431 A1 | 5/2006 | Saifullah et al. |
| 2003/0058816 A1 | 3/2003 | Shearer | | 2006/0098598 A1 | 5/2006 | Gallagher et al. |
| 2003/0087653 A1 | 5/2003 | Leung | | 2006/0099935 A1 | 5/2006 | Gallagher et al. |
| 2003/0092445 A1 | 5/2003 | Timonen et al. | | 2006/0111113 A1 | 5/2006 | Waris |
| 2003/0112789 A1 | 6/2003 | Heinonen et al. | | 2006/0114871 A1 | 6/2006 | Buckley et al. |
| 2003/0114158 A1 | 6/2003 | Soderbacka et al. | | 2006/0116125 A1 | 6/2006 | Buckley et al. |
| 2003/0119480 A1 | 6/2003 | Mohammed | | 2006/0133393 A1 | 6/2006 | Yun |
| 2003/0119490 A1 | 6/2003 | Mohammed | | 2006/0146803 A1 | 7/2006 | Bae et al. |
| 2003/0119527 A1 | 6/2003 | Labun et al. | | 2006/0166687 A1 | 7/2006 | Edman |
| 2003/0119548 A1 | 6/2003 | Mohammed | | 2006/0179474 A1 | 8/2006 | Bichot |
| 2003/0130005 A1 | 7/2003 | Weisshaar et al. | | 2006/0183482 A1 | 8/2006 | Ueda |
| 2003/0130008 A1 | 7/2003 | Rajaniemi et al. | | 2006/0198347 A1 | 9/2006 | Hurtta et al. |
| 2003/0139180 A1 | 7/2003 | McIntosh et al. | | 2006/0223532 A1 | 10/2006 | Liu et al. |
| 2003/0142673 A1 | 7/2003 | Patil et al. | | 2006/0239277 A1 | 10/2006 | Gallagher et al. |
| 2003/0172264 A1 | 9/2003 | Dillon | | 2006/0262778 A1 | 11/2006 | Haumont et al. |
| 2003/0176186 A1 | 9/2003 | Mohammed | | 2006/0268845 A1 | 11/2006 | He et al. |
| 2003/0193952 A1 | 10/2003 | O'Neill | | 2006/0276139 A1 | 12/2006 | Pummill et al. |
| 2003/0210199 A1 | 11/2003 | Sward et al. | | 2006/0286981 A1 | 12/2006 | Summaki et al. |
| 2003/0217132 A1 | 11/2003 | Batten et al. | | 2007/0019600 A1 | 1/2007 | Zhang |
| 2003/0219022 A1 | 11/2003 | Dillon et al. | | 2007/0041360 A1 | 2/2007 | Gallagher et al. |
| 2003/0219024 A1 | 11/2003 | Purnadi et al. | | 2007/0058609 A1 | 3/2007 | Goel et al. |
| 2003/0224820 A1 | 12/2003 | Einola et al. | | 2007/0202891 A1 | 8/2007 | Diachina et al. |
| 2003/0227940 A1 | 12/2003 | Fiat | | 2007/0242672 A1 | 10/2007 | Grayson et al. |
| 2003/0231623 A1 | 12/2003 | Ryu et al. | | 2007/0259673 A1 | 11/2007 | Willars et al. |
| 2003/0235186 A1 | 12/2003 | Park | | 2007/0268855 A1 | 11/2007 | Grayson et al. |
| 2004/0008649 A1 | 1/2004 | Wybenga et al. | | 2007/0286132 A1 | 12/2007 | Vikberg et al. |
| 2004/0009749 A1 | 1/2004 | Arazi et al. | | 2007/0287459 A1 | 12/2007 | Diachina et al. |
| 2004/0013099 A1 | 1/2004 | O'Neill | | 2007/0293222 A1 | 12/2007 | Vikberg et al. |
| 2004/0025018 A1 | 2/2004 | Haas | | 2008/0039086 A1 | 2/2008 | Gallagher et al. |
| 2004/0037312 A1 | 2/2004 | Spear | | 2008/0039087 A1 | 2/2008 | Gallagher et al. |
| 2004/0053623 A1 | 3/2004 | Hoff et al. | | 2008/0043669 A1 | 2/2008 | Gallagher et al. |
| 2004/0057408 A1 | 3/2004 | Gray | | 2008/0076386 A1 | 3/2008 | Khetawat et al. |
| 2004/0063451 A1 | 4/2004 | Bonta et al. | | 2008/0076392 A1 | 3/2008 | Khetawat et al. |
| 2004/0068571 A1 | 4/2004 | Ahmavaara | | 2008/0076393 A1 | 3/2008 | Khetawat et al. |

| | | | |
|---|---|---|---|
| 2008/0076411 A1 | 3/2008 | Khetawat et al. | |
| 2008/0076412 A1 | 3/2008 | Khetawat et al. | |
| 2008/0076419 A1 | 3/2008 | Khetawat et al. | |
| 2008/0076420 A1 | 3/2008 | Khetawat et al. | |
| 2008/0076425 A1 | 3/2008 | Khetawat et al. | |
| 2008/0102794 A1 | 5/2008 | Keevill et al. | |
| 2008/0117841 A1 | 5/2008 | Chen | |
| 2008/0123596 A1 | 5/2008 | Gallagher et al. | |
| 2008/0125120 A1 | 5/2008 | Gallagher et al. | |
| 2008/0130564 A1 | 6/2008 | Gallagher et al. | |
| 2008/0130568 A1 | 6/2008 | Gallagher et al. | |
| 2008/0132224 A1 | 6/2008 | Gallagher et al. | |
| 2008/0132239 A1 | 6/2008 | Khetawat et al. | |
| 2008/0137612 A1 | 6/2008 | Gallagher et al. | |
| 2008/0165725 A1 | 7/2008 | Huomo et al. | |
| 2008/0181204 A1 | 7/2008 | Gallagher et al. | |
| 2008/0207170 A1 | 8/2008 | Khetawat et al. | |
| 2008/0219218 A1* | 9/2008 | Rydnell et al. | 370/331 |
| 2008/0261596 A1 | 10/2008 | Khetawat et al. | |
| 2008/0299976 A1 | 12/2008 | Gallagher et al. | |
| 2008/0299977 A1 | 12/2008 | Gallagher et al. | |
| 2008/0305793 A1 | 12/2008 | Gallagher et al. | |
| 2008/0311916 A1 | 12/2008 | Gallagher et al. | |
| 2008/0318571 A1 | 12/2008 | Vikberg et al. | |
| 2008/0318599 A1 | 12/2008 | Gallagher et al. | |
| 2009/0059848 A1 | 3/2009 | Khetawat et al. | |
| 2009/0061877 A1 | 3/2009 | Gallagher et al. | |
| 2009/0075660 A1 | 3/2009 | Hallenstal et al. | |
| 2009/0082012 A1 | 3/2009 | Gallagher et al. | |
| 2009/0082022 A1 | 3/2009 | Gallagher et al. | |
| 2009/0262704 A1 | 10/2009 | Khetawat et al. | |
| 2010/0074181 A1 | 3/2010 | Markovic et al. | |

FOREIGN PATENT DOCUMENTS

| | | |
|---|---|---|
| EP | 1207708 | 5/2002 |
| EP | 1703673 A1 | 9/2006 |
| EP | 1749371 | 2/2007 |
| EP | 1749372 | 2/2007 |
| EP | 2044715 | 4/2009 |
| EP | 2074839 | 7/2009 |
| EP | 2293640 | 3/2011 |
| EP | 2293645 | 3/2011 |
| GB | 2282735 | 4/1995 |
| GB | 2315193 | 1/1998 |
| GB | 2428937 | 2/2007 |
| GB | 2428942 | 2/2007 |
| GB | 2430120 | 3/2007 |
| GB | 2430121 | 3/2007 |
| GB | 2430839 | 4/2007 |
| GB | 2432082 | 5/2007 |
| WO | WO 92/04796 | 3/1992 |
| WO | WO 97/24004 | 3/1997 |
| WO | WO 99/48312 | 9/1999 |
| WO | WO 99/48315 | 9/1999 |
| WO | WO 00/28762 | 5/2000 |
| WO | WO 00/51387 | 8/2000 |
| WO | WO 02/09448 | 1/2002 |
| WO | WO 02/45456 | 6/2002 |
| WO | WO 03/039009 | 5/2003 |
| WO | WO 03/092312 | 11/2003 |
| WO | WO 2004/002051 | 12/2003 |
| WO | WO 2004/034219 | 4/2004 |
| WO | WO 2004/036770 | 4/2004 |
| WO | WO 2004/039111 | 5/2004 |
| WO | WO 2005/006597 | 1/2005 |
| WO | WO 2005/065214 | 6/2005 |
| WO | WO 2005/069546 A1 | 7/2005 |
| WO | WO 2005/107169 | 11/2005 |
| WO | WO 2005/107297 | 11/2005 |
| WO | WO 2005/114918 | 12/2005 |
| WO | WO 2005/114920 | 12/2005 |
| WO | WO 2006/053102 | 5/2006 |
| WO | WO 2007/015066 | 2/2007 |
| WO | WO 2007/015067 | 2/2007 |
| WO | WO 2007/015068 | 2/2007 |
| WO | WO 2007/015071 | 2/2007 |
| WO | WO 2007/015075 | 2/2007 |
| WO | WO 2008/009016 | 1/2008 |
| WO | WO 2008/036961 | 3/2008 |
| WO | WO 2008/055251 | 5/2008 |
| WO | WO 2008/106360 | 9/2008 |
| WO | WO 2009/021152 | 2/2009 |
| WO | WO 2009/039318 | 3/2009 |

OTHER PUBLICATIONS

U.S. Appl. No. 11/068,445, filed Feb. 24, 2005, Gupta, Rajeev, et al.
Non-Final Office Action of U.S. Appl. No. 11/778,041, Mar. 18, 2009 (mailing date), Gallagher, Michael, et al.
Non-Final Office Action of U.S. Appl. No. 11/778,041, Aug. 21, 2008 (mailing date), Gallagher, Michael, et al.
Non-Final Office Action of U.S. Appl. No. 12/192,532, Feb. 4, 2009 (mailing date), Gallagher, Michael, et al.
Non-Final Office Action of U.S. Appl. No. 12/193,598, Feb. 19, 2009 (mailing date), Gallagher, Michael, et al.
Non-Final Office Action of U.S. Appl. No. 12/194,442, Mar. 16, 2009 (mailing date), Gallagher, Michael, et al.
Non-Final Office Action of U.S. Appl. No. 12/328,719, Jun. 11, 2009 (mailing date), Gallagher, Michael, et al.
Notice of Allowance of U.S. Appl. No. 12/328,719, Nov. 16, 2009 (mailing date), Gallagher, Michael, et al.
Non-Final Office Action of U.S. Appl. No. 12/328,732, Aug. 19, 2009 (mailing date), Gallagher, Michael, et al.
Non-Final Office Action of U.S. Appl. No. 11/129,134, Aug. 28, 2009 (mailing date), Gallagher, Michael, et al.
Notice of Allowance of U.S. Appl. No. 11/226,617, Jun. 8, 2009 (mailing date), Gallagher, Michael, et al.
Notice of Allowance of U.S. Appl. No. 11/229,471, Aug. 6, 2009 (mailing date), Gallagher, Michael, et al.
Non-Final Office Action of U.S. Appl. No. 11/229,471, Apr. 8, 2009 (mailing date), Gallagher, Michael, et al.
Notice of Allowance of U.S. Appl. No. 11/229,470, Jul. 29, 2009 (mailing date), Gallagher, Michael, et al.
Non-Final Office Action of U.S. Appl. No. 11/229,470, May 11, 2009 (mailing date), Gallagher, Michael, et al.
Notice of Allowance of U.S. Appl. No. 11/129,424, Feb. 6, 2009 (mailing date), Gallagher, Michael, et al.
Notice of Allowance of U.S. Appl. No. 11/128,461, May 26, 2009 (mailing date), Markovic, Milan, et al.
Non-Final Office Action of U.S. Appl. No. 11/128,461, Jan. 27, 2009 (mailing date), Markovic, Milan, et al.
Final Office Action of U.S. Appl. No. 11/778,040, Mar. 19, 2009 (mailing date), Gallagher, Michael, et al.
Final Office Action of U.S. Appl. No. 11/778,043, May 28, 2009 (mailing date), Gallagher, Michael, et al.
Non-Final Office Action of U.S. Appl. No. 10/116,311, Feb. 9, 2006 (mailing date), Mohammed, Jahangir.
Non-Final Office Action of U.S. Appl. No. 10/115,767, Dec. 22, 2005 (mailing date), Mohammed, Jahangir.
Non-Final Office Action of U.S. Appl. No. 10/116,023, Apr. 13, 2006 (mailing date), Mohammed, Jahangir.
Non-Final Office Action of U.S. Appl. No. 10/115,835, Jul. 25, 2005 (mailing date), Mohammed, Jahangir.
Final Office Action of U.S. Appl. No. 10/116,186, Feb. 1, 2006 (mailing date), Mohammed, Jahangir.
Non-Final Office Action of U.S. Appl. No. 10/251,901, May 5, 2005 (mailing date), Gallagher, Michael, et al.
Notice of Allowance of U.S. Appl. No. 10/688,470, Jul. 19, 2006 (mailing date), Gallagher, Michael, et al.
Non-Final Office Action of U.S. Appl. No. 10/688,470, Dec. 15, 2005 (mailing date), Gallagher, Michael, et al.
Non-Final Office Action of U.S. Appl. No. 11/004,439, Apr. 21, 2006 (mailing date), Gallagher, Michael.
Non-Final Office Action of U.S. Appl. No. 11/225,870, May 30, 2006 (mailing date), Gallagher, Michael, et al.
Non-Final Office Action of U.S. Appl. No. 11/225,398, Apr. 5, 2006 (mailing date), Gallagher, Michael, et al.
Non-Final Office Action of U.S. Appl. No. 11/225,872 May 8, 2006 (mailing date), Gallagher, Michael, et al.
Non-Final Office Action of U.S. Appl. No. 11/225,872, Sep. 20, 2006 (mailing date), Gallagher, Michael, et al.
Non-Final Office Action of U.S. Appl. No. 11/225,872, Feb. 13, 2007 (mailing date), Gallagher, Michael, et al.

Notice of Allowance of U.S. Appl. No. 11/225,872, Apr. 16, 2007 (mailing date), Gallagher, Michael, et al.
Final Office Action of U.S. Appl. No. 11/225,871, Aug. 18, 2006 (mailing date), Gallagher, Michael, et al.
Non-Final Office Action of U.S. Appl. No. 11/225,871, Dec. 4, 2006 (mailing date), Gallagher, Michael, et al.
Non-Final Office Action of U.S. Appl. No. 11/225,871, Mar. 30, 2006 (mailing date), Gallagher, Michael, et al.
Non-Final Office Action of U.S. Appl. No. 11/225,871, Mar. 21, 2007 (mailing date), Gallagher, Michael, et al.
Notice of Allowance of U.S. Appl. No. 11/225,871, Jun. 27, 2007 (mailing date), Gallagher, Michael, et al.
Non-Final Office Action of U.S. Appl. No. 11/226,617, Apr. 6, 2006 (mailing date), Gallagher, Michael, et al.
Non-Final Office Action of U.S. Appl. No. 11/226,610, Mar. 29, 2006 (mailing date), Gallagher, Michael, et al.
Notice of Allowance of U.S. Appl. No. 11/228,853, Feb. 23, 2007 (mailing date), Gallagher, Michael, et al.
Non-Final Office Action of U.S. Appl. No. 11/228,853, Nov. 22, 2006 (mailing date), Gallagher, Michael, et al.
Non-Final Office Action of U.S. Appl. No. 11/228,853, Jun. 5, 2006 (mailing date), Gallagher, Michael, et al.
Non-Final Office Action of U.S. Appl. No. 11/229,470, Feb. 27, 2008 (mailing date), Gallagher, Michael, et al.
Final Office Action of U.S. Appl. No. 11/229,470, Dec. 14, 2007 (mailing date), Gallagher, Michael, et al.
Non-Final Office Action of U.S. Appl. No. 11/229,470, Jun. 6, 2006 (mailing date), Gallagher, Michael, et al.
Non-Final Office Action of U.S. Appl. No. 11/227,842, Jun. 5, 2006 (mailing date), Gallagher, Michael, et al.
Non-Final Office Action of U.S. Appl. No. 11/227,573, Apr. 6, 2006 (mailing date), Gallagher, Michael, et al.
Non-Final Office Action of U.S. Appl. No. 11/227,840, Apr. 21, 2006 (mailing date), Gallagher, Michael, et al.
Non-Final Office Action of U.S. Appl. No. 11/227,784, Mar. 28, 2006 (mailing date), Gallagher, Michael, et al.
Non-Final Office Action of U.S. Appl. No. 11/927,665, Apr. 2, 2009 (mailing date), Gallagher, Michael, et al.
Final Office Action of U.S. Appl. No. 11/927,665, Nov. 13, 2009 (mailing date), Gallagher, Michael, et al.
International Search Report and Written Opinion for PCT/US2007/083266, Apr. 2, 2008 (mailing date), Kineto Wireless, Inc.
International Preliminary Report on Patentability of PCT/US2007/083266, May 5, 2009 (issuance date), Kineto Wireless, Inc.
International Search Report and Written Opinion for PCT/US2008/054623, Aug. 18, 2008 (mailing date), Kineto Wireless, Inc.
International Preliminary Report on Patentability of PCT/US2008/054623, Aug. 26, 2009 (issuance date), Kineto Wireless, Inc.
International Search Report and Written Opinion for PCT/US2007/073557, Jul. 16, 2008 (mailing date), Kineto Wireless, Inc.
International Preliminary Report on Patentability of PCT/US2007/073557, Jan. 14, 2009 (issuance date), Kineto Wireless, Inc.
International Search Report and Written Opinion for PCT/US2007/79258, Mar. 11, 2008 (mailing date), Kineto Wireless, Inc.
International Preliminary Report on Patentability of PCT/US2007/079258, Mar. 24, 2009 (issuance date), Kineto Wireless, Inc.
International Search Report for PCT/US2003/032855, Apr. 21, 2004 (mailing date), Kineto Wireless, Inc.
International Search Report and Written Opinion for PCT/US2005/016767, Nov. 7, 2005 (mailing date), Kineto Wireless, Inc.
International Preliminary Report on Patentability and Written Opinion for PCT/US2005/016767, Nov. 14, 2006 (mailing date), Kineto Wireless, Inc.
International Search Report and Written Opinion for PCT/US2005/040689, Mar. 13, 2006 (mailing date), Kineto Wireless, Inc.
International Preliminary Report on Patentability and Written Opinion for PCT/US2005/040689, May 15, 2007 (mailing date), Kineto Wireless, Inc.
International Search Report and Written Opinion for PCT/US2005/016921, Sep. 19, 2005 (mailing date), Kineto Wireless, Inc.
International Preliminary Report on Patentability and Written Opinion for PCT/US2005/016921, Nov. 23, 2006 (mailing date), Kineto Wireless, Inc.

*Erricson Press Release*: "Ericsson presents the Mobile@Hometm concept," Mar. 21, 2001, http://www.ericsson.com/press/archive/2001Q1/20010321-0048.html, NPL Date Unknown, printed Jan. 6, 2004, pp. 1-2.
Claus Lindholt Hansen et al., "Mobile@Home—a NEW 1 Use Case for Bluetooth in the Access Network," *LM Ericsson Business Unit Multi-Service Networks*, ISSLS 2002, Apr. 14-18, 2002, Seoul, Korea, www.issls-council.org/proc02/papers/S6A3m.pdf, NPL Date Unknown, printed Dec. 8, 2003, 10 pages.
Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.
Wu, Jon C., et al., "Intelligent Handoff for Mobile Wireless Internet," *Mobile Networks and Applications*, Jan. 6, 2001 Kluwer Academic Publishers, Manufactured in the Netherlands (2001) pp. 67-79.
ETSI TS 124 008 V5.6.0 (Dec. 2002) Digital cellular telecommunications system (Phase 2+); Universal Mobile Telecommunications System (UMTS); Mobile radio interface Layer 3 specification; Core network protocols; Stage 3; (3GPP TS 24.008 version 5.6.0 Release 5); ETSI Standards, European Telecommunications Standards Institute, Sophia-Antipolis, FR, Dec. 2002, pp. 293-317.
ETSI TS 100 940 V7.19.1 (Apr. 2003) Digital cellular telecommunications system (Phase 2+); Mobile radio interface layer 3 specification; (3GPP TS 04.08 version 7.19.1 Release 1998); ETSI Standards, European Telecommunications Standards Institute, Sophia-Antipolis, FR, Apr. 2003, 13 pages.
"$3^{rd}$ Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.
*Digital Enhanced Cordless Telecommunications (DECT); Global System for Mobile Communications (GSM); DECT/GSM Interworking Profile (IWP); Access and Mapping* (protocol/procedure description for 3,1 kHz speech service): ETSI EN 300 370 V1.3.1 European Standard (Telecommunications Series), European Telecommunications Standards Institute, Sophia Antipolis, FR, Jan. 2001, 110 pages.
*Digital Enhanced Cordless Telecommunications (DECT); Global System for Mobile Communications (GSM); DECT/GSM Integration Based on Dual-Mode Terminals:* ETSI EN 301 242 V1.2.2 European Standard (Telecommunications Series), European Telecommunications Standards Institute, Sophia Antipolis, FR, Sep. 1999, 23 pages.
*Digital Enhanced Cordless Telecommunications (DECT); DECT/UMTS Interworking Profile (IWP); Part 1: General Description and Overview:* ETSI TS 101 863-1 V1.1.2, Technical Specification, European Telecommunications Standards Institute, Sophia Antipolis, FR, Nov. 2001, 38 pages.
*Radio Equipment and Systems (RES); Digital Enhanced Cordless Telecommunications/Global System for Mobile Communications (DECT/GSM) Interworking Profile; Profile Overview:* ETSI Technical Report, ETR 341, Source: ETSI DECT, ICS: 33.020, Reference: DTR/RES-03058. European Telecommunications Standards Institute, Sophia Antipolis, FR, Dec. 1996, 27 pages.
"Unlicensed Mobile Access (UMA); User Perspective (Stage 1);" UMA User Perspective (Stage 1) R1.0.0 Technical Specification, Sep. 1, 2004, 29 pages.
"Unlicensed Mobile Access (UMA); Architecture (Stage 2);" UMA Architecture (Stage 2) R1.0.0 Technical Specification, Sep. 1, 2004, 78 pages.
"Unlicensed Mobile Access (UMA); Protocols (Stage 3);" UMA Protocols (Stage 3) R1.0.0 Technical Specification, Sep. 1, 2004, 142 pages.
"Unlicensed Mobile Access (UMA); Architecture (Stage 2);" UMA Architecture (Stage 2) R1.0.1 Technical Specification, Oct. 8, 2004, 80 pages.
"Unlicensed Mobile Access (UMA); Protocols (Stage 3);" UMA Protocols (Stage 3) R1.0.1 Technical Specification, Oct. 8, 2004, 142 pages.
"Unlicensed Mobile Access (UMA); Architecture (Stage 2);" UMA Architecture (Stage 2) R1.0.2 Technical Specification, Nov. 3, 2004, 79 pages.

"Unlicensed Mobile Access (UMA); Protocols (Stage 3);" UMA Protocols (Stage 3) R1.0.2 Technical Specification, Nov. 5, 2004, 142 pages.

"Unlicensed Mobile Access (UMA); Architecture (Stage 2);" UMA Architecture (Stage 2) R1.0.3 Technical Specification, Feb. 28, 2005, 85 pages.

"Unlicensed Mobile Access (UMA); Protocols (Stage 3);" UMA Protocols (Stage 3) R1.0.3 Technical Specification, Feb. 26, 2005, 156 pages.

"Unlicensed Mobile Access (UMA); Architecture (Stage 2);" UMA Architecture (Stage 2) R1.0.4 Technical Specification, May 2, 2005, 87 pages.

"Unlicensed Mobile Access (UMA); Protocols (Stage 3);" UMA Protocols (Stage 3) R1.0.4 Technical Specification, May 2, 2005, 162 pages.

"3rd Generation Partnership Project; Technical Specification Group GSM/EDGE Radio Access Network; Generic Access to the A/Gb interface; Stage 2 (Release X);" 3GPP TS 43.318 V0.3.0, Jan. 2005, 64 pages.

"Proposal for Stage 2 description for Generic Access to A/Gb interface", Tdoc GP-050403, Jan. 24-28, 2005, 1 page.

"3rd Generation Partnership Project; Technical Specification Group GSM/EDGE Radio Access Network; Generic Access to the A/Gb interface; Stage 2 (Release 6)" 3GPP TS 43.318 V0.4.0, Jan. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V2.0.0, Jan. 2005, 66 pages.

"3rd Generation Partnership Project; Technical Specification Group GSM/EDGE Radio Access Network; Generic Access to the A/Gb interface; Stage 2 (Release 6)" 3GPP TS 43.318 V6.0.0, Jan. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V6.1.0, Apr. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V6.2.0, Jun. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V6.3.0, Sep. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V6.4.0, Nov. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V6.5.0, Jan. 2006, 70 pages.

"3rd Generation Partnership Project; Technical Specification Group GSM/EDGE Radio Access Network; Generic Access to the A/Gb interface; Stage 2 (Release 6)" 3GPP TS 43.318 V6.6.0, May 2006, 70 pages.

"3rd Generation Partnership Project; Technical Specification Group GSM/EDGE Radio Access Network; Generic Access to the A/Gb interface; Stage 2 (Release 6)" 3GPP TS 43.318 V6.7.0, Jul. 2006, 71 pages.

"3rd Generation Partnership Project; Technical Specification Group GSM/EDGE Radio Access Network; Generic Access to the A/Gb interface; Stage 2 (Release 6)" 3GPP TS 43.318 V6.8.0, Nov. 2006, 71 pages.

"3rd Generation Partnership Project; Technical Specification Group GSM/EDGE Radio Access Network; Generic Access to the A/Gb interface; Stage 2 (Release 6)" 3GPP TS 43.318 V6.9.0, Feb. 2007, 71 pages.

"3rd Generation Partnership Project; Technical Specification Group GSM/EDGE Radio Access Network; Generic access to the A/Gb interface; Stage 2 (Release 7)" 3GPP TS 43.318 V7.0.0, Nov. 2006, 71 pages.

"3rd Generation Partnership Project; Technical Specification Group GSM/EDGE Radio Access Network; Generic access to the A/Gb interface; Stage 2 (Release 7)" 3GPP TS 43.318 V7.1.0, Feb. 2007, 71 pages.

"Proposal for Stage 3 description for Generic Access to A/Gb interface", Tdoc GP-050279, Jan. 18, 2005, 1 page.

"3rd Generation Partnership Project; Technical Specification Group GSM/EDGE Radio Access Network; Generic Access to the A/Gb interface; Mobile Generic Access Interface Layer 3 Specification (Release x)" 3GPP TS 44.318 Vx.1.0, Jan. 2005, 133 pages.

"3rd Generation Partnership Project; Technical Specification Group GSM/EDGE Radio Access Network; Generic Access to the A/Gb interface; Mobile Generic Access Interface Layer 3 Specification (Release x)" 3GPP TS 44.318 V0.4.0, Apr. 2005, 161 pages.

"3rd Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V0.5.0, Apr. 2005, 160 pages.

"3rd Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V2.0.0, Apr. 2005, 152 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.0.0, Apr. 2005, 146 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.1.0, Jul. 2005, 149 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.2.0, Sep. 2005, 148 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.3.0, Nov. 2005, 149 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.4.0, Jan. 2006, 152 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.5.0, May 2006, 153 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.6.0, Jul. 2006, 153 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.7.0, Dec. 2006, 154 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.8.0, Mar. 2007, 154 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.0.0, Jul. 2006, 153 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.1.0, Dec. 2006, 154 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.2.0, Mar. 2007, 163 pages.

Updated portions of prosecution history of U.S. Appl. No. 11/128,461, Nov. 9, 2009, Markovic, Milan, et al.

Updated portions of prosecution history of U.S. Appl. No. 11/778,043, Feb. 9, 2010, Gallagher, Michael, et al.

EP Office Action of EP05747754, Apr. 15, 2008 (mailing date), Kineto Wireless, Inc.

EP Office Action of EP05747754, Feb. 3, 2010 (mailing date), Kineto Wireless, Inc.

Portions of prosecution history of U.S. Appl. No. 11/778,041, Jun. 22, 2010, Gallagher, Michael, et al.

Supplemental Amendment of U.S. Appl. No. 11/778,043, Jun. 14, 2010, Gallagher, Michael, et al.

Portions of prosecution history of U.S. Appl. No. 11/927,665, Jun. 1, 2010, Gallagher, Michael, et al.

EP Supplementary Search Report of EP07812949, Mar. 26, 2010 (issuance date), Kineto Wireless, Inc.

EP Office Action of EP07812949, Mar. 31, 2010 (issuance date), Kineto Wireless, Inc.

"3$^{rd}$ Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, 90 pages, vol. 3-SA, No. V230, Nov. 2003.

Portions of prosecution history of U.S. Appl. No. 11/110,222, Jan. 21, 2011, Gallagher, Michael D., et al.

Portions of prosecution history of U.S. Appl. No. 11/222,529, Feb. 17, 2011, Goel, Puneet, et al.

Updated portions of prosecution history of U.S. Appl. No. 11/225,872, Apr. 16, 2007, Gallagher, Michael D., et al.

Updated portions of prosecution history of U.S. Appl. No. 11/225,871, Jun. 27, 2007, Gallagher, Michael D., et al.

Portions of prosecution history of U.S. Appl. No. 11/128,615, Dec. 5, 2008, Gallagher, Michael D., et al.

Updated portions of prosecution history of U.S. Appl. No. 11/128,461, Sep. 14, 2009, Markovic, Milan, et al.

Updated Portions of prosecution history of U.S. Appl. No. 11/778,041, Feb. 15, 2011, Gallagher, Michael D., et al.

Updated portions of prosecution history of U.S. Appl. No. 11/778,043, Nov. 10, 2010, Gallagher, Michael D., et al.

Updated portions of prosecution history of U.S. Appl. No. 11/927,665, Feb. 3, 2011, Gallagher, Michael D., et al.

Portions of prosecution history of U.S. Appl. No. 11/927,552, Mar. 9, 2011, Khetawat, Amit, et al.

Portions of prosecution history of U.S. Appl. No. 11/982,402, Mar. 10, 2011, Gallagher, Michael D., et al.

Updated portions of prosecution history of U.S. Appl. No. 12/192,532, Jul. 2, 2010, Gallagher, Michael D., et al.

Updated portions of prosecution history of U.S. Appl. No. 12/194,442, Feb. 23, 2010, Gallagher, Michael D., et al.

Updated portions of prosecution history of U.S. Appl. No. 12/328,732, Jul. 6, 2010, Gallagher, Michael D., et al.

Portions of prosecution history of U.S. Appl. No. 12/564,039, Jun. 30, 2010, Gallagher, Michael D., et al.

International Search Report and Written Opinion for PCT/US2005/013945, Sep. 21, 2005 (mailing date), Kineto Wireless, Inc.

International Preliminary Report on Patentability for PCT/US2005/013945, Oct. 25, 2006 (issuance date), Kineto Wireless, Inc.

Portions of prosecution history of EP05749844, Nov. 11, 2010 (mailing date), Kineto Wireless, Inc.

European Search Report for EP10184667, Mar. 22, 2010 (mailing date), Kineto Wireless, Inc.

Updated portions of prosecution history of EP05747754, Jan. 18, 2011 (mailing date), Kineto Wireless, Inc.

European Search Report for EP10184715, Mar. 22, 2011 (mailing date), Kineto Wireless, Inc.

Portions of prosecution history of EP70812949, Aug. 9, 2010 (mailing date), Kineto Wireless, Inc.

Portions of prosecution history of EP07843030, Aug. 9, 2010 (mailing date), Kineto Wireless, Inc.

Updated Portions of prosecution history of U.S. Appl. No. 11/110,222, Apr. 26, 2011, Gallagher, Michael D., et al.

Updated Portions of prosecution history of U.S. Appl. No. 11/222,529, Jun. 2, 2011, Goel, Puneet, et al.

Updated Portions of prosecution history of U.S. Appl. No. 11/927,665, Jul. 21, 2011, Gallagher, Michael D., et al.

Updated Portions of prosecution history of U.S. Appl. No. 11/927,552, Sep. 15, 2011, Khetawat, Amit, et al.

Updated Portions of prosecution history of U.S. Appl. No. 11/982,402, May 16, 2011, Gallagher, Michael D., et al.

Updated Portions of prosecution history of U.S. Appl. No. 12/564,039, Sep. 7, 2011, Markovic, Milan, et al.

* cited by examiner

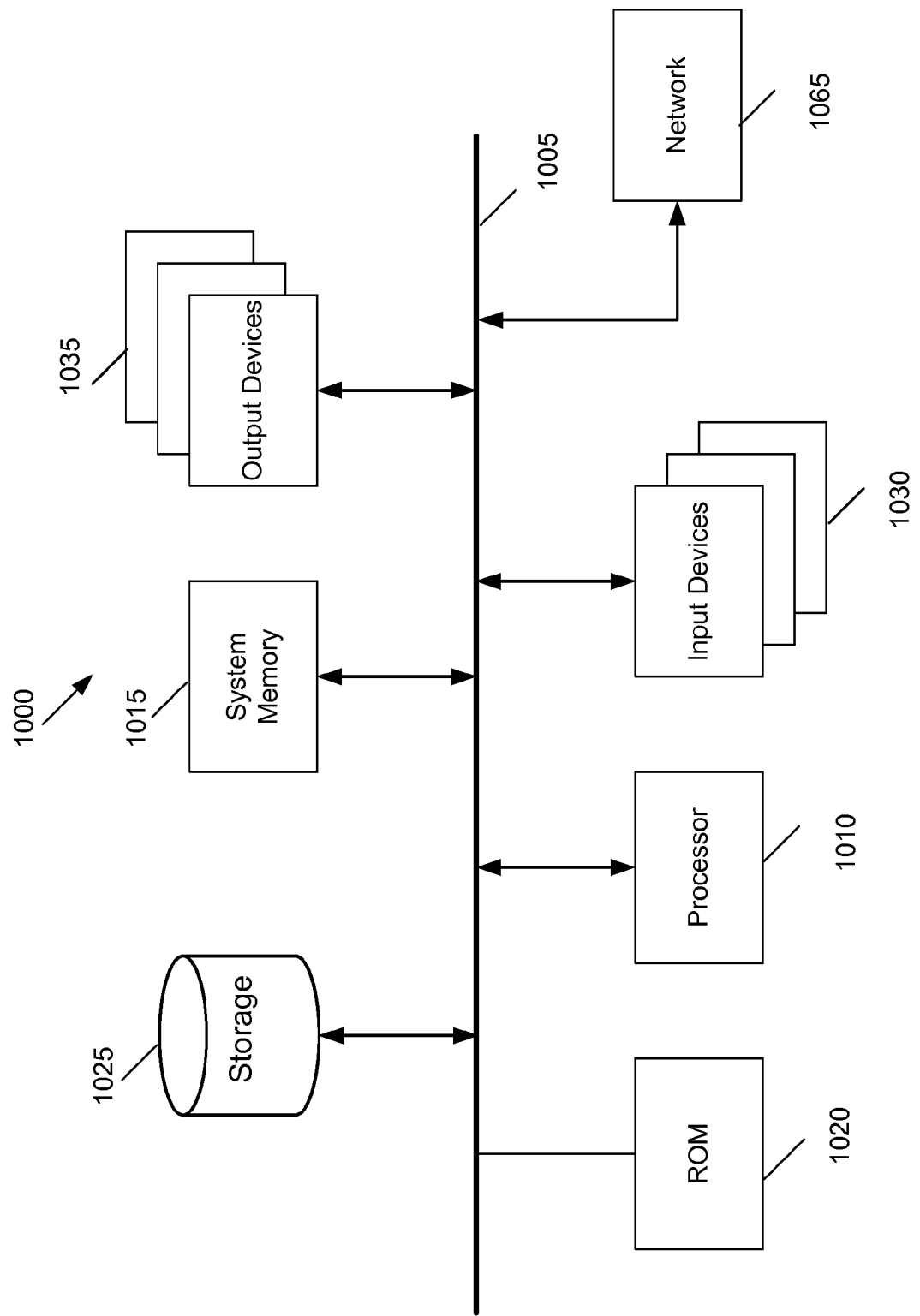

METHOD OF PROVIDING IMPROVED INTEGRATED COMMUNICATION SYSTEM DATA SERVICE

CLAIM OF BENEFIT TO PRIOR APPLICATION

This application claims benefit to the U.S. Provisional Patent Application 60/793,196 filed Apr. 18, 2006. This United States Provisional Patent Application is incorporated herein by reference.

FIELD OF THE INVENTION

The present invention relates to telecommunications. More particularly, it relates to providing improved data services over an integrated communication system.

BACKGROUND OF THE INVENTION

Licensed wireless communication providers have gradually integrated data services into the list of services available to subscribers. The integration of data with voice services has opened a more expansive set of features and functionality not previously available. Features such as accessing the public Internet or text messaging through a cellular telephone are now commonplace.

As the licensed wireless networks continue to evolve, so too do the user equipment for accessing such services. However, integration of the new services has increased the demand on the licensed wireless network as larger blocks of data and more overall data are being routed through these networks. Such added loads place additional burdens on the provider equipment making access to such resources scarcer or slower. As a result, subscribers require greater bandwidth and more efficient utilization of the available bandwidth.

As one example, at the inception of the global system for mobile communications (GSM), only voice services were provided through the GSM core network. By using circuit switched data to provide a dedicated communication channel through to an endpoint, the voice services of GSM were poorly suited to adapt and provide data services using the existing set of core components.

As GSM evolved, general packet radio service (GPRS) functionality was added to the core components of the GSM network to provide data services through the GSM network with little change to the existing core voice network. In contrast to the circuit switching of voice communication, the GPRS elements introduced packet switching allowing for greater utilization of the available bandwidth resulting in greater user access. Through the packet switching of GPRS, a single data communication no longer had to reserve the full bandwidth of a circuit. Rather, the intermittent sending and receiving of data packets was facilitated over a shared communication medium through which data packets of several subscribers were routed.

However, fully utilizing the functionality and data services of the GPRS network required the licensed wireless service providers to integrate with other existing networks such as the public Internet (e.g., to provide mobile Internet access). This form of integration with other networks introduced even greater functionality and sets of services to the licensed wireless network as the data packets communicated over the GSM network had access to the Internet and other communication networks. Routing IP information from user equipment of the licensed wireless network to the public Internet and vice versa now became a viable option for licensed wireless providers.

To provide such data services, service providers implemented specific data service routing and processing components and new interfaces for passing data from and between such components. For example, in addition to the A-interface for voice communications over the GSM network, the Gb-interface was introduced to route data packets between the GSM core network and radio access network. Similarly, in the UMTS Terrestrial Radio Access Network (UTRAN), the Iu-cs interface is used for voice communications and the Iu-ps interface is used to route data packets between the UTRAN and the core network. As demand for data services on mobile devices continue to increase, faster networks and more efficient means to route the data are continually being added to the core network.

Moreover, as the integration between licensed wireless communication networks and data networks have converged, similarly other communication networks are being integrated with the licensed wireless networks to take advantage of the functionality provided by the licensed wireless networks. One such technology is an integrated communication system (ICS) for coupling the user equipment of a licensed wireless communication network to an access point of a second different communication network for seamlessly communicating and passing packet data from the user equipment through the second communication network. An example of such an integrated communication system is the universal mobile access (UMA, also known as "unlicensed mobile access" and "generic access") architecture.

An effective implementation of such an integrated communication system is to leverage the existing packet data switching infrastructure of the licensed wireless network in order to provide data services equivalent to or better than those of the licensed wireless network. In this manner, a need arises to scale the data services and infrastructure of the licensed wireless communication networks to adapt to and integrate with the other communication networks.

A simple implementation of the ICS includes encapsulating information compatible from one network into a wrapper compatible with the licensed wireless network and further encapsulating the information into a wrapper of the data network (e.g., IP network). However, such encapsulation, encoding, and decoding introduces latencies and additional overhead that is undesirable in a real world application where subscribers continually demand for more information and faster retrieval of such information. Therefore, a need arises to provide improved and efficient data services over a voice and data communication network integrated with the licensed communication network. Such a system should utilize the resources already available within the licensed wireless network while reducing the overhead and complexity associated with providing such services.

SUMMARY OF THE INVENTION

Some embodiments provide a method and apparatus for seamlessly providing voice and data services across a licensed wireless network while accessing a second different communication network through a user equipment. The first and second communication networks include licensed wireless networks, unlicensed wireless networks, or Internet Protocol (IP) networks, to name a few. Furthermore, some embodiments of the second communication network include a modified interface for directly interfacing with components of the first communication network in order to pass and retrieve data packets from the user equipment.

BRIEF DESCRIPTION OF THE DRAWINGS

FIG. 10 conceptually illustrates a computer system with which some embodiments are implemented.

DETAILED DESCRIPTION OF THE INVENTION

Figure 1:
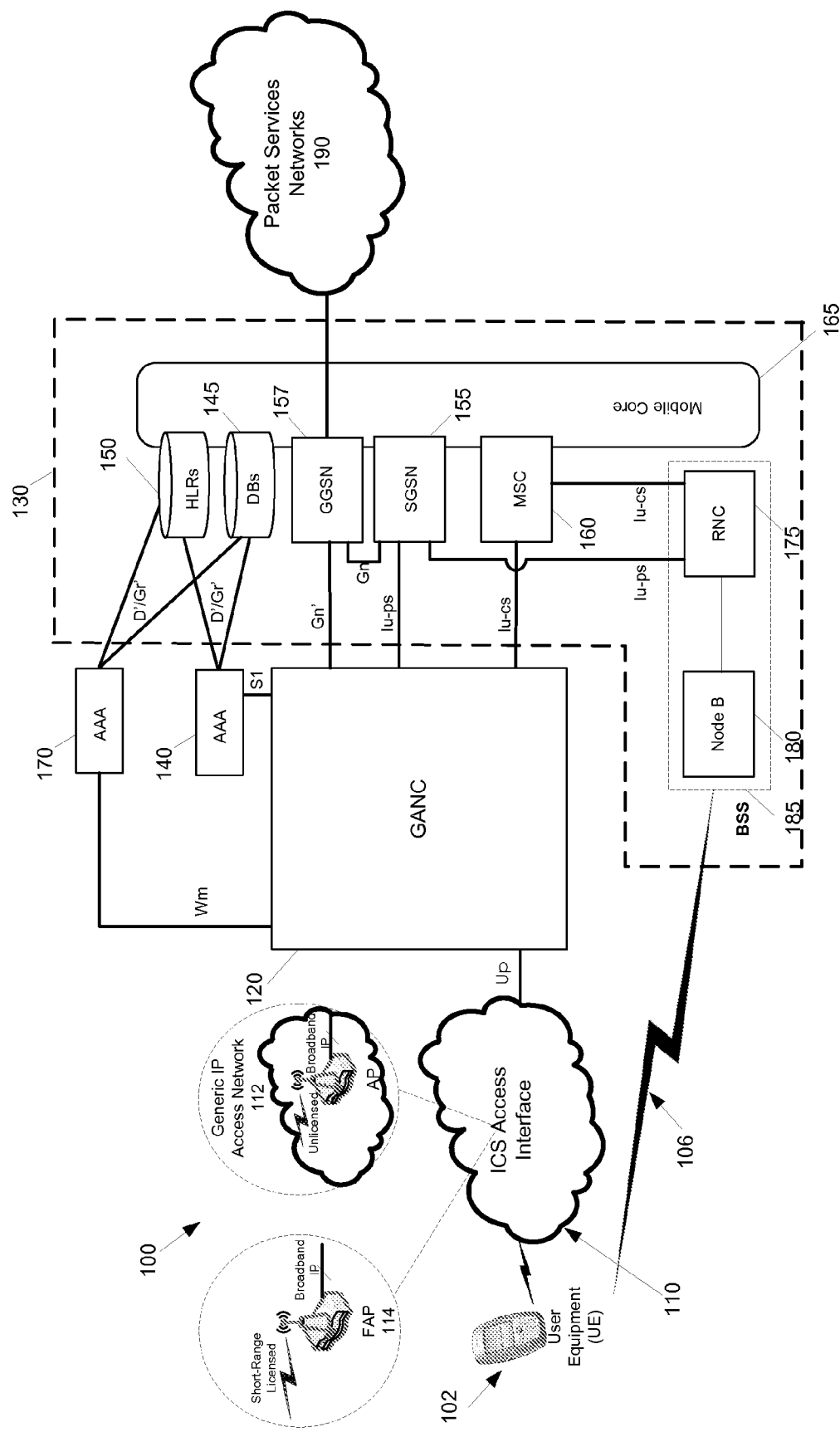
FIG. 1 provides an overview of the integrated communication system (ICS) network in accordance with some embodiments of the present invention.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail. Moreover, throughout the following description, acronyms commonly used in the telecommunications industry for wireless services are utilized along with acronyms specific to the present invention. A table of acronyms specific to this application is included in Appendix I. A listing of cited references is included in Appendix II.

I. Overview

Some embodiments provide a method and apparatus for seamlessly providing voice and data services across a licensed wireless network while accessing a second different communication network through a user equipment. The first and second communication networks include licensed wireless networks, unlicensed wireless networks, or Internet Protocol (IP) networks, to name a few. Furthermore, some embodiments of the second communication network include a modified interface for directly interfacing with components of the first communication network in order to pass and retrieve data packets from the user equipment.

In some embodiments, the user equipment (UE) includes various communication devices that operate in either an unlicensed wireless network or licensed wireless network. However, when the user equipment is within range of an integrated communication system (ICS), the user equipment may establish voice and/or data services over a different communication network. For example, the ICS of some embodiments seamlessly integrates and establishes voice and/or data services of a licensed wireless device through an unlicensed communication network. In some embodiments, the user equipment includes a cellular telephone, smart phone, personal digital assistant, dual-mode handset, WiFi handset, or computer equipped with a subscriber identity mobile (SIM) card for communicating over the licensed or unlicensed wireless networks. Moreover, in some embodiments the computer equipped with the SIM card communicates through a wired communication network.

Alternatively, in some embodiments the user equipment includes a fixed wireless device providing a set of terminal adapter functions for connecting Integrated Services Digital Network (ISDN), Session Initiation Protocol (SIP), or Plain Old Telephone Service (POTS) terminals to the ICS. Application of the present invention to this type of device enables the wireless service provider to offer the so-called landline replacement service to users, even for user locations not sufficiently covered by the licensed wireless network. Moreover, some embodiments of the terminal adapters are fixed wired devices for connecting ISDN, SIP, or POTS terminals to a different communication network (e.g., IP network) though alternate embodiments of the terminal adapters provide wireless equivalent functionality for connecting through unlicensed or licensed wireless networks.

In some embodiments, the unlicensed wireless network is a short-range unlicensed wireless network facilitated by a radio link employing a wavelength (or wavelength range) in a free spectrum (e.g., spectrum around 2.4 GHz, 5 GHz, 11-66 GHz). An unlicensed wireless service hosting an unlicensed wireless channel may have an associated communication protocol. As an example, the unlicensed wireless service may be a wireless local area network (LAN) (WiFi) service (e.g., the IEEE 802.11a, b, n, or g wireless standard).

In some embodiments, the licensed wireless network is a GSM or GPRS type wireless network serviced by wireless providers. However, one of ordinary skill in the art will recognize that the invention can be embodied through any user equipment or other communication network compatible with the ICS without departing from the spirit of the invention. For example, the licensed wireless network can include a UMTS Terrestrial Radio Access Network (UTRAN) or GSM EDGE Radio Access Network (GERAN).

In some embodiments, an ICS access interface provides the seamless interface for establishing voice and data services for a user equipment of a first communication network across a second different network. In some embodiments, the ICS access interface includes an unlicensed wireless network through which voice and data services established over the unlicensed wireless network are routed through an IP broadband network. In some embodiments, the ICS access interface includes an access point (AP) for creating the unlicensed wireless network through which voice and data services established over the unlicensed wireless network are routed through to the IP broadband network.

Alternatively, in some embodiments, the ICS access interface creates a short-range licensed wireless network that operates independent from any licensed wireless network of a service provider. The ICS access interface then routes voice and data services established over the short-range licensed wireless network through an IP broadband network. In some embodiments, the ICS access interface includes a femtocell access point (FAP) for creating the short-range licensed wireless network through which voice and data services established over the short-range licensed wireless network are routed through to the broadband IP network. In this manner, a user equipment of a licensed wireless network (e.g. GSM or UMTS cellular telephone), when in range of the ICS access interface or the FAP, may bypass the wide area licensed wireless network of the licensed service provider and instead establish the voice and/or data services transparently through the short-range licensed wireless network of the ICS access interface. The ICS access interface then transparently routes the voice and/or data services over the broadband IP network instead of the licensed wireless network of the service provider. As a result, the user equipment can communicate over two different communication networks without requiring any changes.

Such added functionality provides the user with potentially improved quality of service in the service regions of the ICS access interface (e.g., within the service range of a corresponding AP/FAP). Thus, when a subscriber is within range of the ICS access interface, the subscriber enjoys low cost, high speed, and high quality voice and data services. In addition, the subscriber enjoys extended service range since the handset can receive services deep within a building at locations that otherwise may not be reliably serviced by a wide area licensed wireless network service provider. At the same time, the subscriber can roam outside the range of the ICS access interface without dropping communications. Instead, roaming outside the range of the ICS access interface results in a seamless handoff (also referred to as a handover) where communication and data services are automatically provided by the wide area licensed wireless network of the service provider, as described in the U.S. Pat. No. 6,922,559.

II. Architecture

FIG. 1 illustrates an integrated communication system (ICS) architecture 100 in accordance with some embodiments of the present invention. ICS architecture 100 enables user equipment (UE) 102 to access a voice and data network 165 via either a licensed wireless communications session 106 or an ICS access interface 110 through which components of the licensed wireless core network 165 are alternatively accessed. In some embodiments, the communication session includes voice services, data services, or both.

The licensed wireless core network 165 includes one or more Home Location Registers (HLRs) 150 and databases 145 for subscriber authentication and authorization. Once authorized, the UE 102 may access the voice and data services of the licensed core network 165. In order to provide such services, the licensed core network 165 includes a mobile switching center (MSC) 160 for providing access to the voice services. Data services are provided for through a Serving GPRS (General Packet Radio Service) Support Node (SGSN) 155 in conjunction with a gateway such as the Gateway GPRS Support Node (GGSN) 157.

The SGSN 155 is typically responsible for delivering data packets from and to the GGSN 157 and the user equipment within the geographical service area of the SGSN 155. Additionally, the SGSN 155 may perform functionality such as mobility management, storing user profiles, and storing location information. However, the actual interface from the licensed core network 165 to various external data packet services networks 190 (e.g., public Internet) is facilitated by the GGSN 157. As the data packets originating from the user equipment typically are not structured in the format with which to access the external data networks, it is the role of the GGSN 157 to act as the gateway into such packet services networks. In this manner, the GGSN 157 provides addressing for data packets passing to and from the UE 102 and the external packet services networks 190. Moreover, as the user equipment of a licensed wireless network traverses multiple service regions and thus multiple SGSNs, it is the role of the GGSN 157 to provide a static gateway into the external data networks 190.

In some embodiments, the packet services networks 190 include the public Internet from which data packets originating from the UE 102 access various data servers such as email and web servers. However, it will be apparent to one of ordinary skill in the art that other packet services networks and data providing servers are similarly accessible through the gateway created by the GGSN 157 of the licensed core network 165.

In the illustrated embodiment, the licensed wireless network depicts components common to a UMTS Terrestrial Radio Access Network (UTRAN), based cellular network that includes multiple base stations referred to as Node Bs 180 (of which only one is shown for simplicity) that facilitate wireless communication services for various user equipment 102 via respective licensed radio links 106 (e.g., radio links employing radio frequencies within a licensed bandwidth). However, one of ordinary skill in the art will recognize that in some embodiments, the licensed wireless network may include other licensed wireless networks such as GSM/GPRS and GERAN to name a few.

The licensed wireless channel 106 may comprise any licensed wireless service having a defined Base Station Subsystem (BSS) interface protocol (e.g., lu-cs and lu-ps interfaces) for a voice/data network. The BSS 185 typically includes at least one Node B 180 and a Radio Network Controller (RNC) 175 for managing the set of Node Bs 180. Typically, the multiple Node Bs 180 are configured in a cellular configuration (one per each cell) that covers a wide service area.

Each RNC 175 communicates with components of the core network 165 through a standard radio network controller interface such as the lu-cs and lu-ps interfaces depicted in FIG. 1. For example, a RNC 175 communicates with MSC 160 via the UTRAN lu-cs interface for circuit switched voice services. Additionally, the RNC 175 communicates with SGSN 155 via the UTRAN lu-ps interface for packet data services through GGSN 157. Moreover, one of ordinary skill in the art will recognize that in some embodiments, other networks with other standard interfaces may apply. For example, the RNC 175 in a GSM/GPRS network is replaced with a Base Station Controller (BSC) that communicates voice to the MSC 160 via an A interface and the BSC communicates data to the SGSN via a Gb interface of the GSM/GPRS network.

In some embodiments of the ICS architecture, the user equipment 102 is connected to the licensed wireless core network 165 via a second communication network facilitated by the ICS access interface 110 and a Generic Access Network Controller (GANC) 120 (also referred to as a Universal Network Controller (UNC)). In some embodiments, the voice and data services over the ICS access interface 110 are facilitated via a generic IP access network 112. Moreover, in some embodiments the generic IP access network 112 includes an Access Point (AP). Alternatively, in some embodiments the voice and data services over the ICS access interface are facilitated via a femtocell access point (FAP) 114 communicatively coupled to a broadband IP network. In accordance with some embodiments, the AP or FAP 114 will be located in a fixed structure, such as a home or an office building. In some embodiments, the service area of the AP or FAP includes an indoor portion of a building, although it will be understood that the service area may include an outdoor portion of a building or campus.

In some embodiments, the UE 102 connects to the generic IP access network through an accessible unlicensed wireless network. Signals from the unlicensed wireless network are then transmitted over the generic IP access network. The unlicensed wireless network of some embodiments includes radio links employing a wavelength (or wavelength range) in an unlicensed, free spectrum (e.g., spectrum around 2.4 GHz, 5 GHz, 11-66 GHz). An unlicensed wireless service hosting the unlicensed wireless network may have an associated communication protocol. As an example, the unlicensed wireless service may be a wireless local area network (LAN) (WiFi) service (e.g., the IEEE 802.11a, b, n, or g wireless standard).

The signaling from the UE 102 is passed over the ICS access interface 110 to the GANC 120. After the GANC 120 performs authentication and authorization of the subscriber, the GANC 120 communicates with components of the core licensed wireless network 165 using a radio network controller interface that is similar to radio network controller interface of the UTRAN described above, and includes a UTRAN lu-cs interface for circuit switched voice services and a UTRAN lu-ps interface for packet data services (e.g., GPRS). In this manner, the GANC 120 appears to the UTRAN core network as a UTRAN BSS network element (e.g., the Node B 180 and RNC 175) and is managed and operated as such.

Additionally, the GANC 120 communicates with other system components of the ICS system through several other interfaces, which are (1) "Up", (2) "Wm", (3) "D'/Gr'", (4) "Gn'", and (5) "S1". The "Up" interface is the standard interface for session management between the UE 102 and the GANC 120. The "Wm" interface is a standardized interface between the GANC 120 and an Authorization, Authentication, and Accounting (AAA) Server 170 for authentication and authorization of the UE 102 into the ICS. The "D'/Gr'" interface is the standard interface to the HLR 160 and the "Gn'" interface is a modified interface for direct communications with the data services gateway (e.g., GGSN) of the core licensed network. Some embodiments optionally include the "S1" interface. In these embodiments, the "S1" interface provides an authorization and authentication interface from the GANC 120 to an AAA 140 server. In some embodiments, the AAA server 140 that supports the S1 interface and the AAA server 170 that supports Wm interface may be the same.

In some embodiments, the UE 102 must register with the GANC 120 prior to accessing ICS services. Registration information of some embodiments includes a subscriber's International Mobile Subscriber Identity (IMSI), a Media Access Control (MAC) address, and a Service Set Identifier (SSID) of the serving access point as well as the cell identity from the GSM or UTRAN cell upon which the UE 102 is already camped. The GANC 120 then passes this information to the AAA server 140 to authenticate the subscriber and determine the services (e.g., voice and data) available to the subscriber. If approved by the AAA 140 for access, the GANC 120 will permit the UE 102 to access voice and data services of the ICS system.

These voice and data services are seamlessly provided by the ICS to the UE 102 through the various interfaces described above. For example, when a UTRAN core network is integrated with the ICS, voice services are provided through the GANC 120 over the standard lu-cs interface. When data services are requested by the UE 102, the ICS uses the Gn' interface for directly communicating with a GGSN 157. The Gn' interface allows the GANC 120 to avoid the overhead and latency associated with communicating with the SGSN 155 over the lu-ps interface of the UTRAN or the Gb interface of the GSM core networks prior to reaching the GGSN 157. Moreover, it should be apparent to one of ordinary skill in the art that the GANC 120 may directly communicate over a similar Gn' interface with the gateways of other communication networks, such as GERAN.

Fewer components along the data services path also results in fewer layers of encapsulation being added and removed to the data packets. For instance, in the GSM and GERAN core networks, communication with the SGSN would require the addition of the Logical Link Control (LLC) protocol or the Sub Network Dependence Convergence Protocol (SNDCP) encapsulation layers. However, in bypassing the SGSN and directly communicating with the GGSN, these layers become unnecessary.

Figure 2:
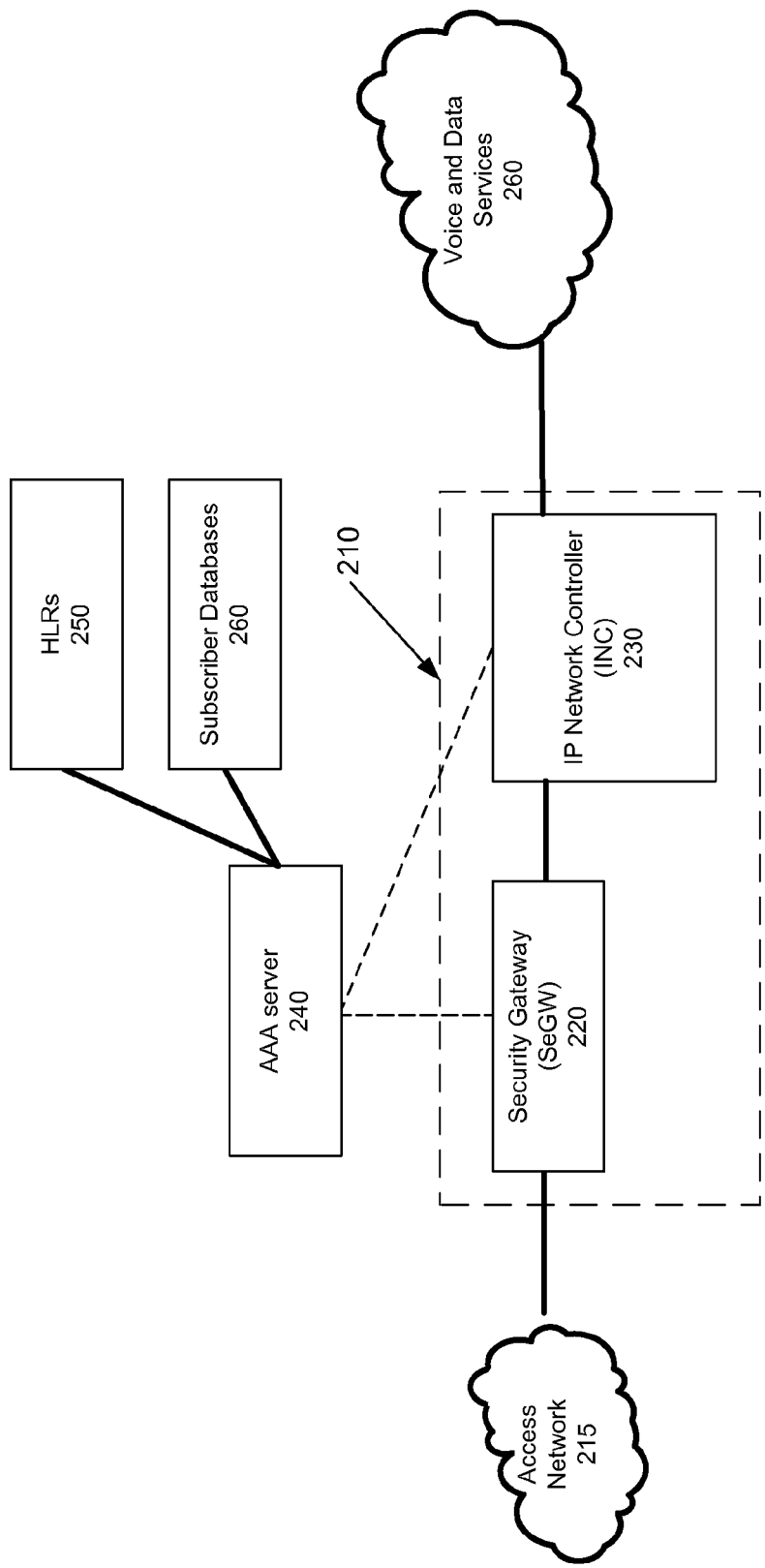
FIG. 2 provides an example of a Generic Access Network Controller (GANC) in accordance with some embodiments of the invention.

FIG. 2 presents an illustrative example of a GANC 210 in accordance with some embodiments of the invention. The GANC 210 includes a Security Gateway (SeGW) 220 and an IP Network Controller (INC) 230. The SeGW component 220 of the GANC 210 provides a secure entrance for a user equipment (e.g., via an IP Security (IPSec) tunnel) to the voice and data services of the telecommunication network 260. The SeGW 220 terminates the secure tunnel and works with one or more authorization, authentication, and accounting (AAA) servers 240 to authenticate the ICS subscriber. The AAA servers 240 communicate with one or more HLRs 250 and subscriber databases 260 that store information pertaining to the ICS subscriber.

Once authenticated, the AAA 240 notifies the INC 230 through a separate communication exchange. Moreover, the INC 230 may receive or pass communications directly to and from the SeGW 220 through additional communication exchanges. The INC 230 then proceeds to manage the subscriber's access to all voice and data services 260 using one of the various interfaces described above with regards to the UTRAN, GSM, and GERAN networks. For instance, in communicating with a user equipment, the GANC 210 in some embodiments terminates the Generic Access Packet Switched Resources (GA-PSR) protocol used in passing signaling between the user equipment and the GANC 210. The GANC 210 then inter-works the GA-PSR messages through an lu-ps interface into the licensed wireless core network using the Radio Access Network Application Part (RANAP) protocol. However, one of ordinary skill in the art will realize that the GANC 210 can be implemented using various other communication interfaces. Moreover, in some embodiments, the GANC 210 includes only some of the components described with regards to FIG. 2 or may additionally include various other components. For example, the SeGW 220 can be separated from the rest of the GANC 210 while the AAA server 240 can be made part of the GANC 210.

Some embodiments of the above mentioned devices, such as the user equipment 102, FAP 114, or GANC 120, include electronic components, such as microprocessors and memory (not shown), that store computer program instructions for executing wireless protocols for managing voice and data services in a machine-readable or computer-readable medium as further described below in the section labeled "Computer System". Examples of machine-readable media or computer-readable media include, but are not limited to magnetic media such as hard disks, memory modules, magnetic tape, optical media such as CD-ROMS and holographic devices, magneto-optical media such as optical disks, and hardware devices that are specially configured to store and execute program code, such as application specific integrated circuits (ASICs), programmable logic devices (PLDs), ROM, and RAM devices. Examples of computer programs or computer code include machine code, such as produced by a compiler, and files containing higher-level code that are executed by a computer, an electronic component, or a microprocessor using an interpreter.

Moreover, some embodiments of the user equipment 102, FAP 114, or GANC 120 provide an interface conversion function to convert the signaling of the unlicensed service or short-range licensed service into a conventional base station subnetwork (BSS) interface (e.g., an Iu-cs interface and an Iu-ps interface or an A interface and a Gb interface). Alternatively, some embodiments of the user equipment 102, FAP 114, and GANC 120 provide an interface conversion function to convert the signaling of the unlicensed service or licensed service into other network interfaces compatible with the GANC 120 and the ICS architecture, such as an IP/Ethernet interface.

As a result of the protocol conversion, voice and data services are established transparently to the voice and data network 130 (e.g., the voice and data network 130 use their standard interfaces and protocols for the voice and data services as they would with a conventional communication session handled by a conventional licensed Node B). Accordingly, protocols for a seamless handoff of services that are transparent to the voice and data network 130 are facilitated. This permits, for example, a single phone number to be used for both the licensed wireless service and the unlicensed wireless service.

Additionally, the present invention permits a variety of services that were traditionally offered only through licensed wireless services to be offered through an unlicensed wireless network, short-range wireless network, broadband connection, or other integrated network of the ICS. The user thus gets the benefit of potentially higher quality voice and data services when their user equipment is located within the area serviced by the unlicensed wireless network, short-range licensed wireless network, or broadband connection.

The data services typically include the following services: Text Messaging, Picture Messaging, Instant Messaging, Mobile Internet Access, Streaming Audio, Streaming Video, Email access, incoming Short Message Service (SMS) news feeds, downloading applications, downloading ringtones, to name a few. However, it should be apparent to one of ordinary skill in the art that various implementations of the ICS architecture include other known data services or alternatives to the described services.

III. Facilitation of Data Services over ICS

As described with reference to FIG. 1, some embodiments of an ICS system seamlessly integrate communication networks of two different communication networks so that a user equipment of a first communication network receives seamless and equivalent voice and data services whether connected through a second communication network or the first communication network. In order to provide this seamless communication, some embodiments of the ICS system leverage the existing infrastructure of the first network so that the functionality and the components of the first network providing the functionality do not have to be re-implemented. Moreover, by using protocols and interfaces common to the user equipment and the integrated first network, the ICS implementation will allow the user equipment of the first communication network to remain unaltered while still being able to receive the benefits of communicating over the second communication network.

In this manner, the burden of translation and conversion between signaling of the user equipment of the first communication network to the signaling of the second communication network and back to the infrastructure of the first communication network is seamlessly handled by components of the ICS. Specifically, the GANC of some embodiments provides the validation, routing, and conversion functionality necessary to allow the user equipment of the first communication network to establish voice and data services when connected through the second communication network.

Providing voice and data services over the ICS network is described in U.S. Pat. No. 7,127,250. In some such embodiments, the second communication network interfaces with a licensed wireless communication network at the stage of the BSS 185 shown in FIG. 1. In an ICS with an integrated UTRAN network, voice services are routed from the GANC over the Iu-cs interface to the MSC before reaching a voice network. Data services are routed from the GANC over the Iu-ps interface to the SGSN which then routes the data packets over the Gn interface to an appropriate data services GGSN before reaching the data network.

In this manner, several protocols and layers of encapsulation are needed to route data originating from the user equipment through to the GANC, SGSN, GGSN, and ultimately the data network. For instance, in a GERAN network, the Gb interface may be a frame relay interface while the Gn interface is entirely based on the IP protocol. Communications between the user equipment and the SGSN use the LLC protocol to provide data-link services as specified within the Open System Interconnection (OSI) seven-layer model and the SNDCP to map network level protocols to the underlying logical link control. To transport the LLC data units over the Gb interface, the GERAN typically utilizes the Base Station Subsystem GPRS Protocol (BSSGP). Included within the BSSGP messaging are the LLC data units, an identity of the user equipment, and typically a corresponding set of Quality of Service (QoS) parameters.

Such BSSGP messages are then routed from the SGSN to the GGSN by way of the GPRS Tunneling Protocol (GTP). GTP provides an unreliable data transport function through its use of the User Datagram Protocol (UDP). GTP transmits the IP datagrams originating from the user equipment through to the GGSN. Additionally, this series of data exchanges is preceded by a series of registration and activation messages first between the user equipment and the SGSN and subsequently by a series of registration and activation messages between the SGSN and the GGSN.

A. Improved Data Service Over ICS

Some embodiments of the ICS provide improved data services by directly accessing components deeper within the infrastructure of the licensed wireless communication network. In this manner, non-essential components for providing data services such as the SGSN are bypassed and instead a direct link to the GGSN is established from the GANC. The additional processing, latency, and complexity associated with such non-essential data service components are eliminated. Moreover, the additional overhead associated with data conversion for interfacing with the unnecessary components is reduced. Therefore, packets intended for the GGSN are directly encapsulated for processing by the GGSN as opposed to encapsulating and decapsulating the packets for traveling across the various interfaces that are otherwise present in the licensed network.

Some embodiments perform this direct encapsulation by linking the IP datagrams sent from the user equipment directly to the Gn or IP based interface of the data service providing GGSN of the licensed wireless network. As illustrated in FIG. 1, an ICS of some embodiments integrates an unlicensed wireless, short-range licensed wireless, or broadband IP network (not depicted; e.g., for a softmobile) to a licensed wireless network. The signals from the unlicensed, short-range licensed, or broadband network are all communicated through an ICS access interface. In some embodiments, the ICS access interface includes an IP network which uses the same IP protocol for communicating with a GGSN. In this manner, direct tunneling to the GGSN provides lower latency and faster data services.

One method for direct tunneling over an interworked wireless local access network (I-WLAN) to a GGSN is described within the 3$^{rd}$ Generation Partnership Project document titled "3GPP System to Wireless Local Area Network (WLAN) interworking". As described therein, a subset of the Gn interface referred to as the Gn' interface is defined for re-using existing GGSN components of a licensed wireless core network to implement data service functionality using a direct tunnel with user equipment communicating over a WLAN. Therefore, functionality such as charging gateway interfaces, IP address allocation, authentication in external networks, and single access to services provided by a Public Land Mobile Network (PLMN) using IP bearer capability between a user equipment of a WLAN and the PLMN are provided without requiring changes to the GGSNs of the core network. In some embodiments, a minimal implementation of the Gn' interface would include the following messages of the Gn interface: Create Packet Data Protocol (PDP) Context Request/Response, Update PDP Context Request/Response, Delete PDP Context Request/Response, error indication, version not supported, and GTP payload forwarding.

Figure 3:
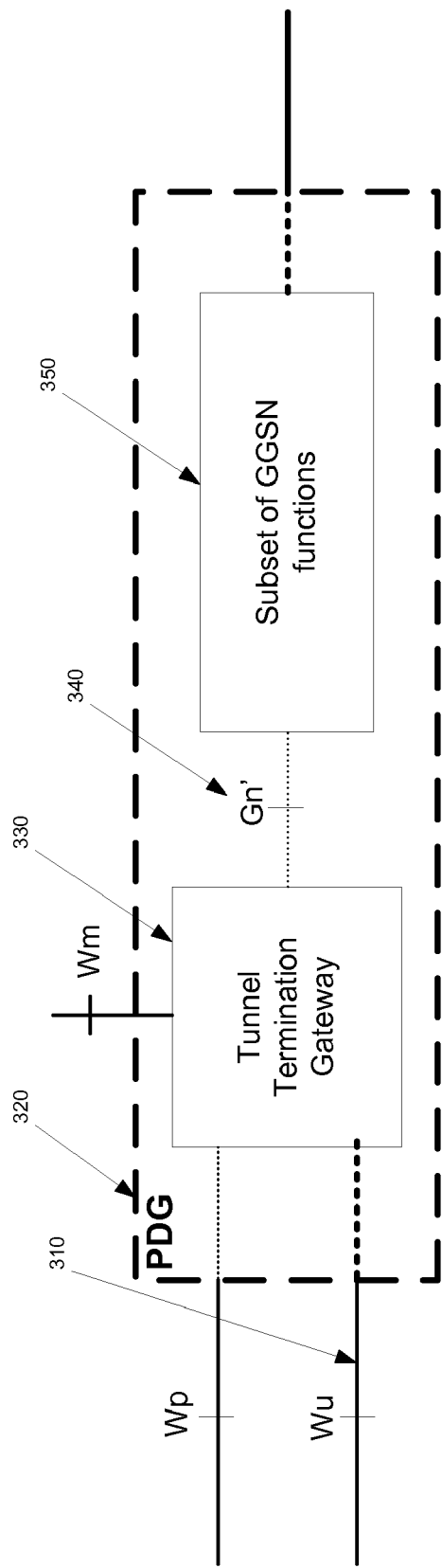
FIG. 3 provides an illustrative embodiment for direct tunneling over a Interworking Wireless Local Area Network.

An illustrative implementation for direct tunneling over an I-WLAN is presented in FIG. 3. In this figure, a Packet Data Gateway (PDG) 320 includes various interfaces for communicating with different components of the I-WLAN. A Wireless Local Access Network (WLAN) user equipment (UE) interfaces with the Tunnel Terminating Gateway (TTG) 330 of the PDG 320 over one such interface after receiving authorization to access the WLAN. Once authorized, the WLAN UE interfaces with the TTG 330 over a Wu interface 310. The Wu interface 310 represents a WLAN UE initiated tunnel for passing data between the WLAN UE and the PDG 320. The WLAN UE sends a request to establish a tunnel to the TTG 330. When the TTG 330 receives the tunnel request from the WLAN UE, the TTG 330 performs a second authorization of the WLAN UE to determine whether the WLAN UE is authorized to access the data services of the network. The TTG 330 attempts to authorize and authenticate the WLAN UE with an AAA server (not shown). If approved, the TTG 330 will receive various identification information of the WLAN UE and based on the information terminates the end-to-end tunnel setup between the WLAN UE and the PDG 320. The TTG 330 then proceeds to establish a GTP tunnel with the GGSN functional part 350 of the PDG 320 over the Gn subset interface or Gn' interface 340. In this manner, each end-to-end tunnel established by the WLAN UE is mapped on a one-to-one basis with a GTP tunnel established by the TTG 330.

While the I-WLAN direct tunneling method bypasses the SGSN of the core network, the I-WLAN direct tunneling method nevertheless added the TTG into the core network and the additional overhead associated with the TTG authorizing the UE for data services. In order to further improve data services and the speed and quality associated with such data services, some embodiments of the ICS, integrate a complete set of functionality needed to communicate with the GGSN into the pre-existing GANC.

Moreover, in some embodiments of the ICS, the user equipment is no longer confined to a one-to-one mapping between an end-to-end tunnel and a GTP tunnel. Rather, the GANC manages several GTP tunnels for a single end-to-end tunnel established between the UE and the GANC. Additionally, some embodiments provide true end-to-end communication between the user equipment and the GGSN as will be described below. As a result, fewer resources and less complexity are needed to provide equivalent data services functionality in the ICS to that of the I-WLAN and licensed wireless networks.

B. ICS Implementation for Direct Tunneling

Referring back to FIG. 1, some embodiments of the invention directly link the GANC using the Gn' interface to the GGSN. When the UE registers with the GANC, the GANC accesses an AAA server to perform authorization. If approved, the GANC at this time retrieves service information associated with the UE. In some embodiments, the service information includes the services available to the subscriber (e.g., data services such as text messaging), and location information associated with the UE. However, it should be apparent to one of ordinary skill in that art, that the AAA server may pass additional information for the subscriber to the GANC.

Moreover, the registration in some embodiments may include additional signaling to enable the creation of a transport channel for the passage of GPRS data packets from the UE to the GANC. In some embodiments, the transport channel carries IP packets containing user data. Use of such "IP transport channels" (IPTCs) enables some embodiments of the invention to directly communicate with the GGSN without the overhead associated with additional layered protocols (e.g., SNDCP and LLC encapsulated data packets) between the IP packet containing the user data and the transport channel. In this manner, IP packets containing user data transparently traverse from end node (e.g., the UE) to end node (e.g., the GGSN) without the overhead of traditional transport channel encapsulation. Moreover, such data services are enabled without requiring the additional TTG component or other components of an I-WLAN implementation described above.

i. ICS Tunnel Creation

Figure 4:
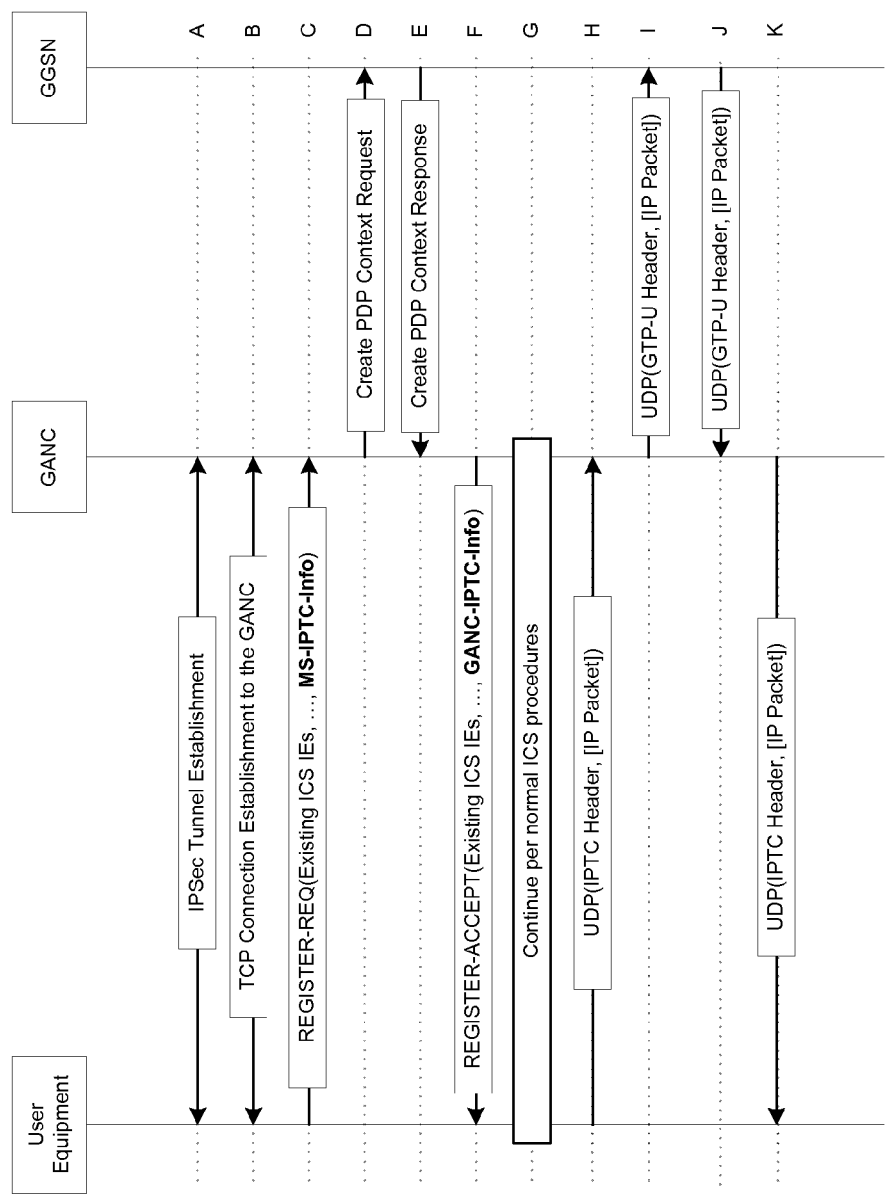
FIG. 4 is a message and data flow diagram illustrating messages and operations employed to facilitate establishing a single Packet Data Protocol (PDP) context with a GANC acting as a GPRS tunneling protocol (GTP)-User endpoint in accordance with some embodiments of the invention.

In some embodiments, a GTP tunnel for providing data services is established when the UE registers with the GANC. FIG. 4 presents a message and operation sequence of some embodiments for establishing a single GTP tunnel (e.g., Packet Data Protocol (PDP) context) with a GANC acting as a GTP-User (GTP-U) endpoint. Prior to initiating the data services request, the UE establishes (at step A) a secure IPSec tunnel with the GANC. With the secure IPSec tunnel established, the UE performs (at step B) TCP handshaking with the GANC in order to create a reliable communication pathway. The UE then registers (at step C) with the GANC. During registration the UE sends (at step C) a Register Request message to the GANC. The Register Request message includes various identification information of the UE. For example, the identification information of some embodiments includes the IMSI of the UE and a MAC address associated with an AP through which the UE communicates to the GANC. Additionally, the Register Request message includes information for establishing an IPTC for sending data packets through the ICS and elements of the licensed core network into a data network (e.g., Internet). The IPTC information may include an indication that the UE supports the IPTC feature and the UE UDP port number that the UE wishes to use for the IPTC.

Once the request is received by the GANC, the GANC emulates services of a traditional SGSN in establishing a GTP tunnel with a GGSN over the Gn' interface using established PDP messaging. However, certain overhead and latency is removed due to the fact that a traditional SGSN of a licensed wireless network receives a temporary identifier associated with the UE and would have to determine the permanent identity of the UE (e.g., IMSI) before preceding. Moreover, the SGSN typically contacts a Home Location Register (HLR) to identify subscription data associated with the IMSI of the UE and to request from the HLR authentication data required to authenticate the UE. Once authenticated for GPRS service, the UE receives from the SGSN an accept message to indicate that the UE may proceed with data service. However, such identification and authentication is already present within the GANC after the UE is authenticated and authorized for ICS service (e.g., via communication between the GANC and AAA servers).

Therefore, at step D, the GANC contains all necessary information to establish a PDP context for the UE without the overhead associated with a traditional SGSN (e.g., SNDCP and LLC encapsulation). Moreover, the GANC sends (at step D) a Create PDP Context Request (e.g., activate a PDP context) message to an associated GGSN using the Gn' interface described above. In this manner, the GANC contains a direct Gn' interface with the GGSN without having to introduce a new component such as the TTG into the ICS or the licensed core network.

Prior to sending the request message, the GANC allocates a PDP context data structure which in some embodiments includes the subscriber's IP address, the subscriber's International Mobile Subscriber Identity (IMSI), and a tunnel ID which is a unique number to identify the tunneled data related to a particular PDP context. In some embodiments, the GTP tunnel is further identified with an IP address, a UDP port, and a PDP type specifying the type of payload transferred on the PDP context (e.g., IPV4, IPV6, X.25, PPP, etc.).

The GGSN processes the Context Request message of step D and if a GTP is successfully established, a Create PDP Context Response message is returned (at step E) to the GANC to indicate that the GTP tunnel is available for the UE to access data services across the GGSN. The GANC conveys (at step F) to the UE that data services are available to the UE through a Register-Accept message containing a GANC-IPTC-Info parameter. The GANC-IPTC-Info parameter contains information for accessing the data services using the IPTC (e.g., the GANC IP address and UDP port number and an IPTC identifier).

The UE can now access data services in addition to other services authorized by the GANC. For instance, the UE may separately or in conjunction with the data services perform (at step G) location updates, receive voice calls, establish voice calls, or perform other non-data related functions. However, in order to pass data messages across the GTP tunnel, the UE creates (at step H) a UDP message with header information for sending the packet to the GANC and a payload containing the data service message. The UDP packet is forwarded (at step H) to the GANC. The GANC strips (at step I) the IPTC header information in order to place the GTP-U header information for sending the UDP packet to the GGSN. The message is forwarded (at step I) to the GGSN which then routes the packet into the desired data network. When a data packet is received (at step J) at the GGSN, the GGSN forwards the message back to the GANC. The GANC again replaces (at step K) the header information so that the packet is returned to the UE.

Figure 5:
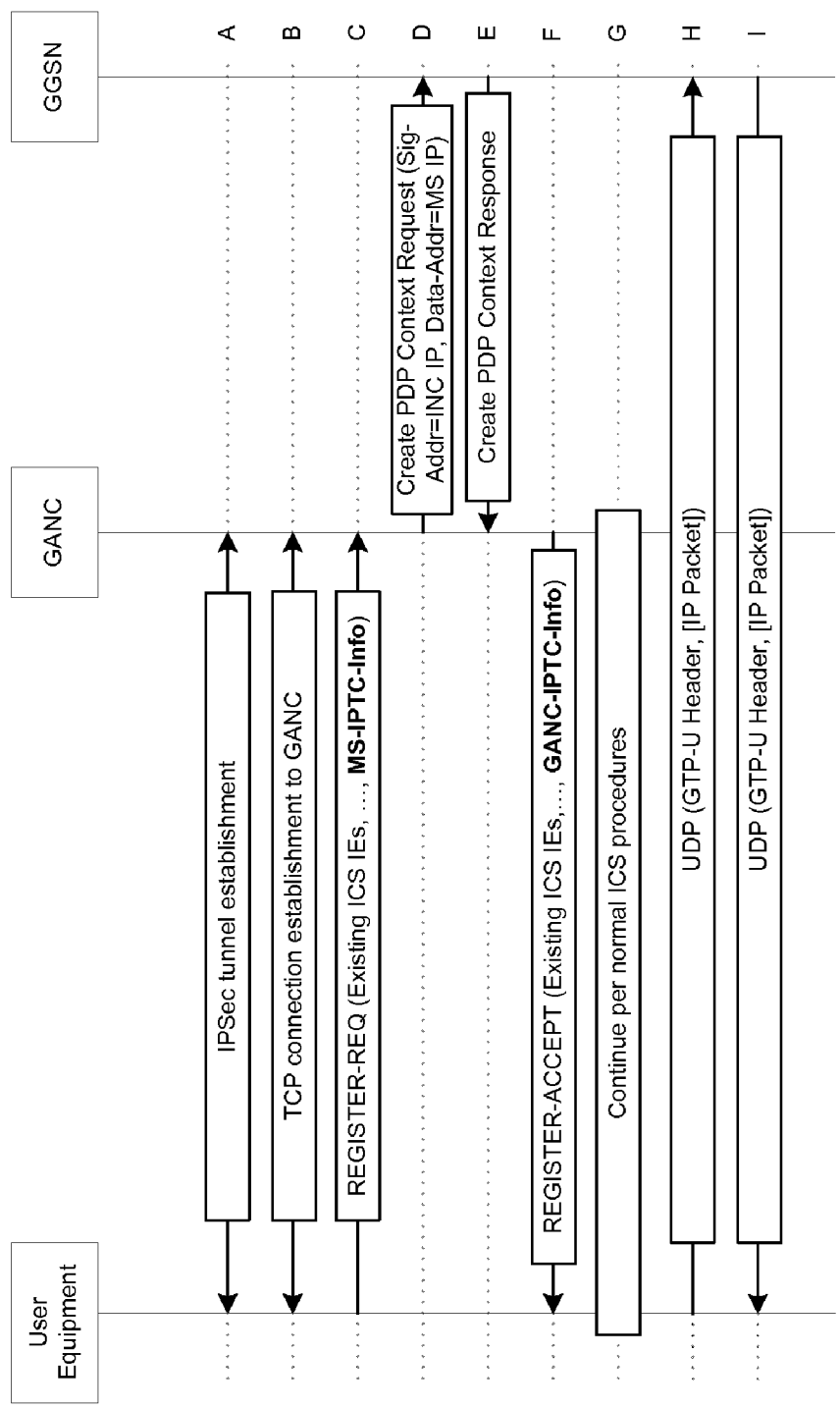
FIG. 5 is a message and data flow diagram illustrating messages and operations employed to facilitate establishing a single PDP context with a user equipment (UE) acting as a GTP-U endpoint in accordance with some embodiments of the invention.

Alternatively, FIG. 5 presents a message and operation sequence of some embodiments for establishing a single PDP context in which the UE acts as a GTP-U endpoint. Steps A-C are similar to those of FIG. 4 in connecting and requesting data services from the ICS. However, at step D, rather than create a tunnel with the GANC as the endpoint, the GANC sends to the GGSN a Create PDP Context Request message in which the control address associated with the tunnel setup messaging contains the address of the GANC while the data address used for passing data packets is assigned an IP addressed associated with the UE. Also, at step F, the GANC sends the data address of the GGSN to the UE plus the required GTP-U tunnel identifiers, rather than the GANC address and IPTC identifier. In this manner, the UE directly passes data packets through the GANC to the GGSN without processing by the GANC and the GGSN passes data packets through the GANC to the UE without processing by the GANC.

For example, after the GANC notifies (at step F) the UE that a GTP tunnel for data services has been established, the UDP packets sent (at step H) from the UE contain header information for routing directly to the GGSN. Therefore, when such packets arrive at the GANC, the GANC need only look to the destination address field containing the GGSN's IP address and forward the packet to the GGSN. In contrast to FIG. 4, the message sequence of FIG. 5, eliminates additional latency by removing processing of the data packets by the GANC from data message pathway. Specifically, the GANC no longer has to process the UDP data packets and need only route them to the already specified destination. Moreover, the GANC no longer maintains overhead information for changing the destination address of incoming UDP data packets to that of the GGSN. This allows the GANC to free resources for other functions.

Figure 6:
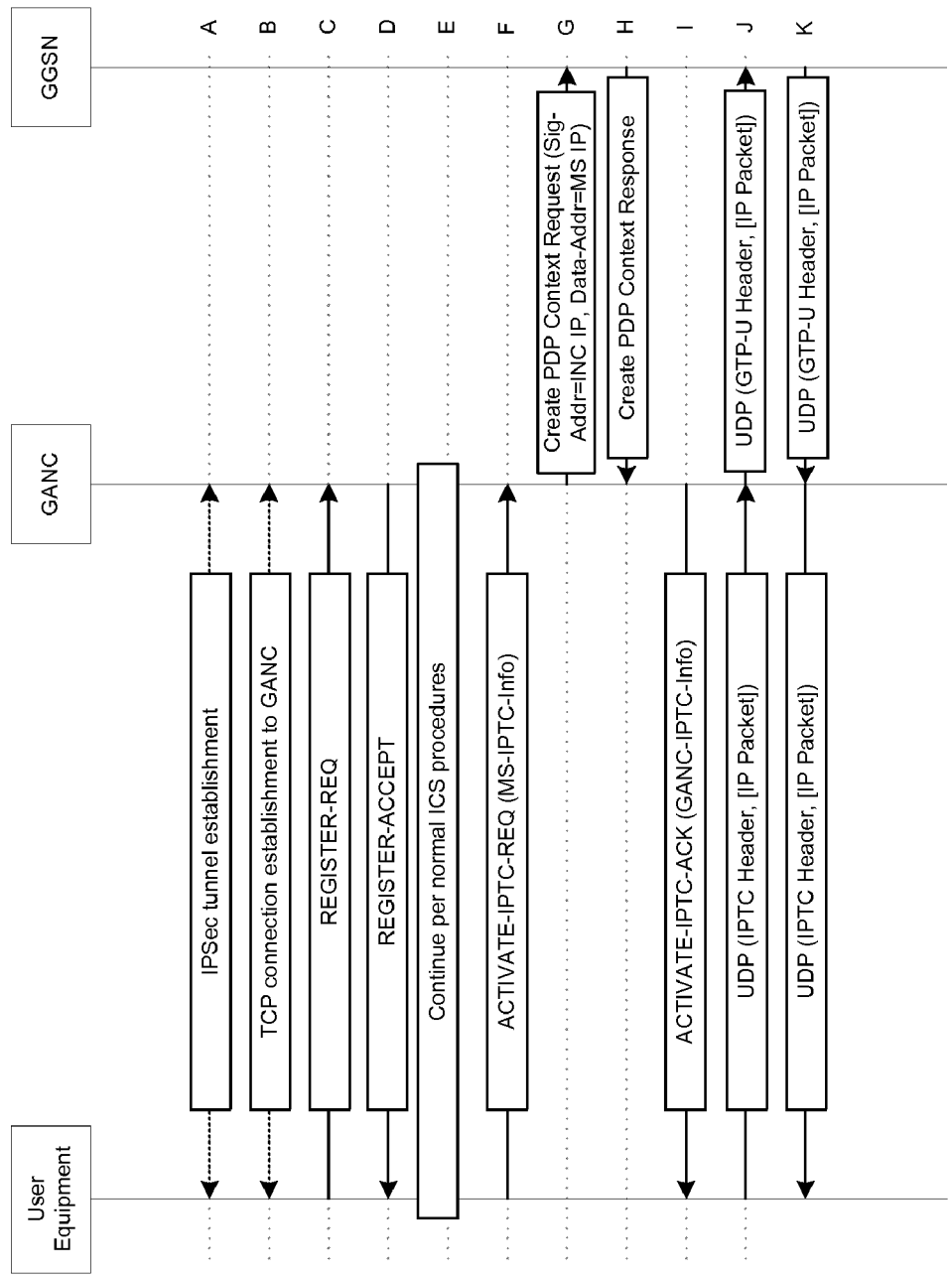
FIG. 6 is a message and data flow diagram illustrating messages and operations employed to facilitate establishing multiple PDP contexts through an IP Security (IPSec) tunnel with the GANC in which the GANC acts as a GTP-U endpoint in accordance with some embodiments of the invention.

FIG. 6 presents a message and operation sequence of some embodiments for establishing multiple PDP contexts through a single secure IPSec tunnel with the GANC in which the GANC acts as a GTP-U endpoint. In this figure, steps A-B establish the communication path between the UE and the GANC. Similarly, at step C a Register Request message is sent from the UE to the GANC, indicating that the UE supports the multiple IPTC feature. After registration of the UE, the GANC responds (at step D) with a Register Accept message to the UE indicating whether the multiple IPTC feature is allowed for the specific UE and if the multiple IPTC feature is supported by the GANC.

At step E, the UE can continue with other non-data service related procedures (e.g., voice calling). Alternatively, the UE sends (at step F) an Activate-IPTC-REQ message to the GANC. This message informs the GANC to establish a GTP tunnel with the GGSN so that data messages from the UE will successfully be routed through the GGSN to reach their destination in the data network. Therefore, the GANC sends (at step G) a Create PDP Context Request message to the GGSN. In reply, the GGSN will create (at step H) the GTP tunnel and return a Create PDP Context Response to the GANC. The GANC then sends to the UE an Activate-IPTC-ACK to acknowledge that the GTP tunnel for data services was successfully created and providing the necessary IPTC information to the UE (e.g., GANC IP address and UDP port, and IPTC tunnel identifier).

In this embodiment, the UE may establish multiple GTP tunnels for accessing several different data services simultaneously. Should the UE require multiple data services from different destinations, the UE would issue another Activate-IPTC-REQ message, similar to step F, to inform the GANC to establish an additional GTP tunnel for additional data services. For instance, the UE of some embodiments initiates an instant message chat session while downloading audio. In some embodiments, the UE supports up to eleven current PDP contexts while the GANC supports a virtually unlimited number of PDP contexts based on the data load and internal memory and processing power of the GANC. However, it should be apparent to one of ordinary skill in the art that various UEs may support more or less PDP contexts. Steps J-K illustrate routing of UDP packets through the GANC to the GGSN similar to steps H-K of FIG. 4.

Figure 7:
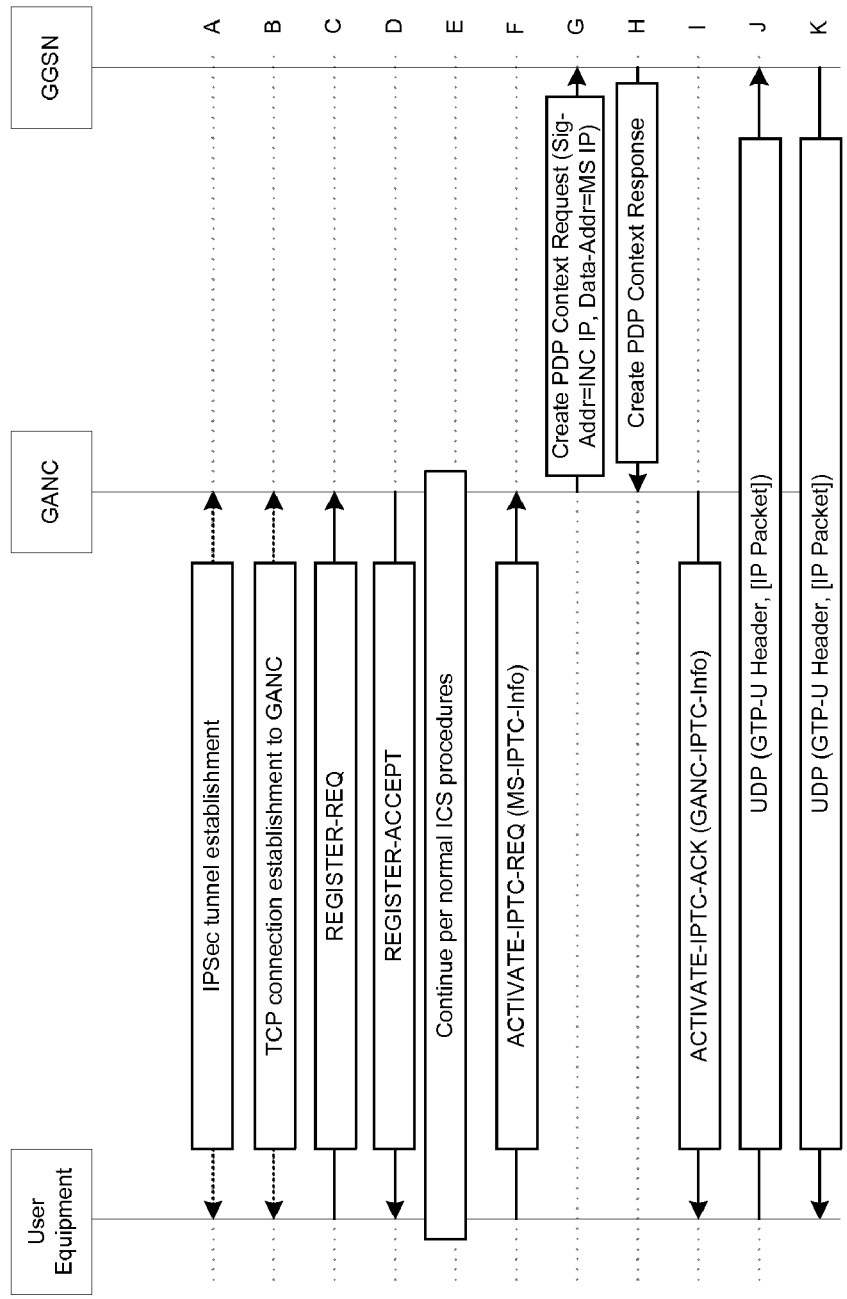
FIG. 7 is a message and data flow diagram illustrating messages and operations employed to facilitate establishing multiple PDP contexts through a single IPSec tunnel with the GANC in which the UE acts as a GTP-U endpoint in accordance with some embodiments of the invention.

In still some other embodiments, the message and operation sequence of FIG. 7 establishes multiple PDP contexts through a single secure IPSec tunnel with the GANC in which the UE acts as the GTP-U endpoint. In this messaging exchange, steps A-I are similar to steps A-I of FIG. 6. with the modifications to the IPTC information exchange described above for FIG. 5. In this way, the UDP packets sent from the UE at step J contains the GTP-U header for routing the packet through the GANC directly to the GGSN without requiring the GANC to process or alter header information in the UDP packet in a manner that is analogous to FIG. 5. However, it should be apparent to one of ordinary skill in the art, that in some embodiments, the GANC may process and convert the UE UDP packet irrespective of whether the UDP packet header contains the GTP-U header. In this manner, the GANC can support functionality for either UEs directly addressing the GGSN or the GANC.

ii. ICS Tunnel Release

Figure 8:
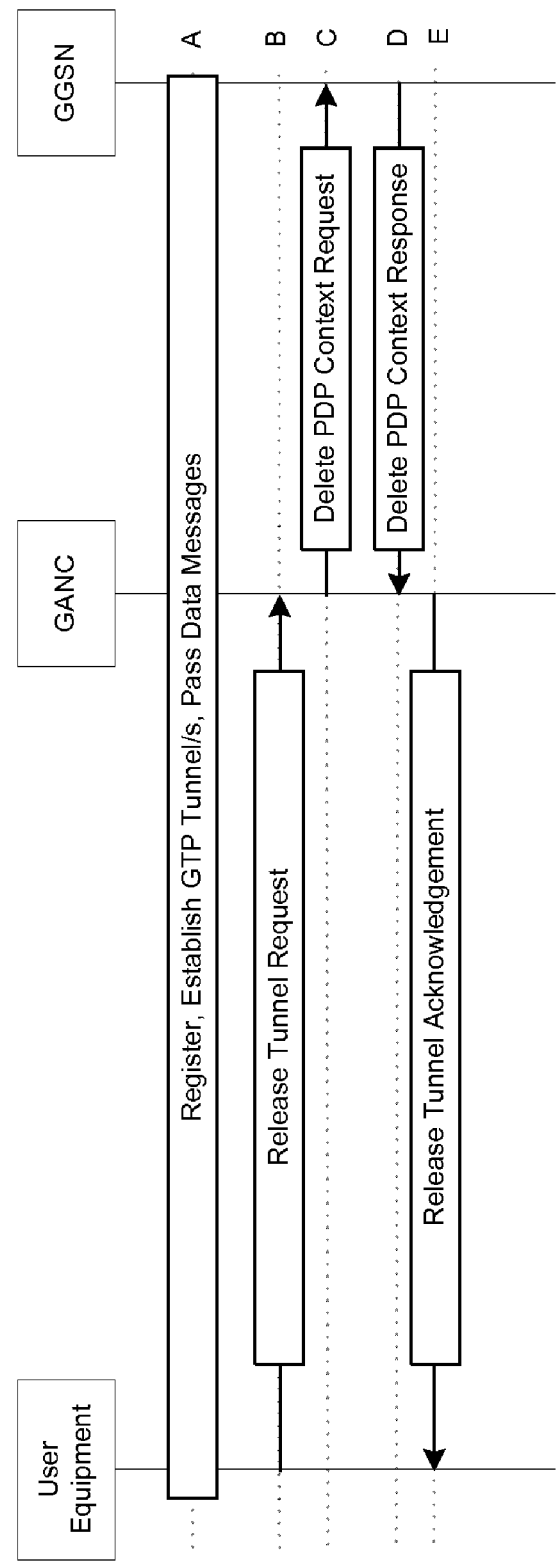
FIG. 8 is a message and data flow diagram illustrating messages and operations employed to facilitate releasing an established GTP tunnel where the release message is initiated by the UE in accordance with some embodiments of the invention.

FIG. 8 illustrates a messaging exchange of some embodiments for releasing a UE initiated tunnel. Step A summarizes the registration, tunnel setup, and message exchange described with reference to FIGS. 5, 6, and 7 above. However, FIG. 8 further includes steps B-E which illustrate the messaging exchange for release of an established GTP tunnel.

When the UE no longer needs data services of the GGSN, it will send (at step B), a release tunnel request to the GANC. The GANC conveys (at step C) the release tunnel message to the GGSN via a Delete PDP Context Request message. After receiving the release request, the GGSN responds (at step D) to the GANC with a Delete PDP Context Response message to indicate that the tunnel will be terminated. The GANC then notifies (at step E) the UE that the tunnel has been successfully released.

Figure 9:
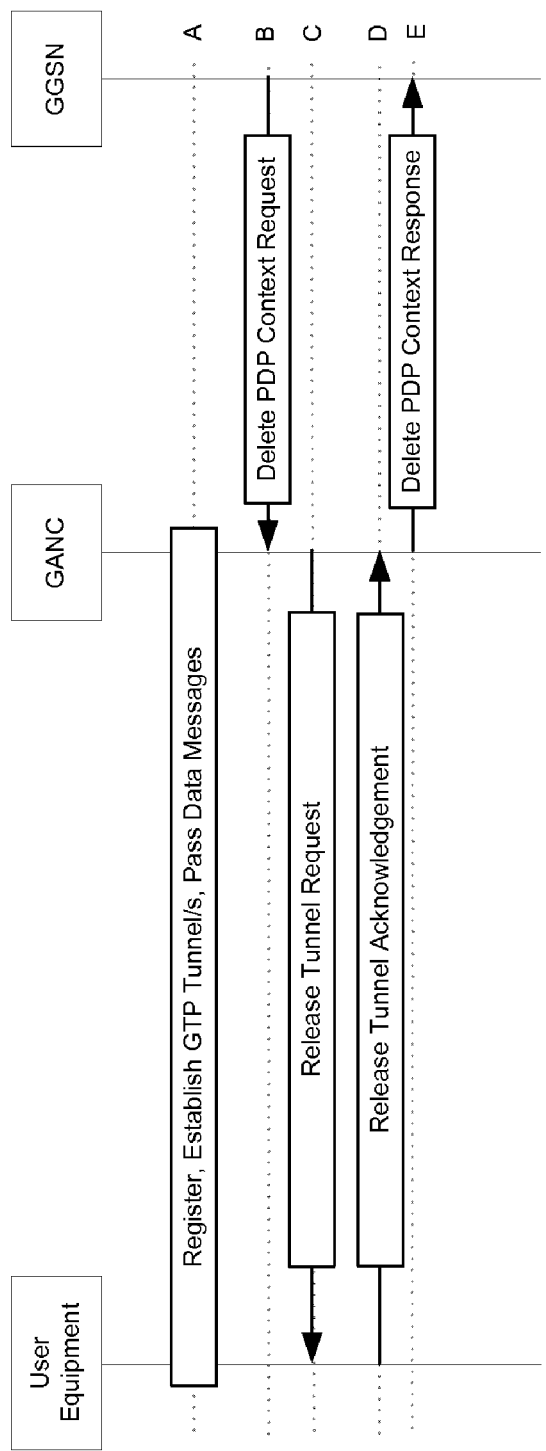
FIG. 9 is a message and data flow diagram illustrating messages and operations employed to facilitate releasing an established GTP tunnel where the release message is initiated by the network in accordance with some embodiments of the invention.

Alternatively, in some embodiments illustrated in FIG. 9, the tunnel release request comes from the network. As illustrated, the GGSN submits (at step B) a Delete PDP Context Request to the GANC which notifies (at step C) the UE of the tunnel release. The UE returns (at step D) an acknowledgement to the GANC indicating that the tunnel may be released. The GANC then relays (at step E) the acknowledgement to the GGSN via a Delete PDP Context Response message. At this point the tunnel is released and specific data services for which the tunnel was intended for are no longer available.

Though FIGS. 8 and 9 have illustrated some embodiments of tunnel releasing, it should be apparent to one of ordinary skill in the art that tunnel release requests may be initiated by other components of the system. For example, a tunnel release request may be initiated by an AAA server should access be denied to the UE at some point during use of the tunnel.

IV. Computer System

FIG. 10 conceptually illustrates a computer system with which some embodiments of the invention are implemented. The computer system 1000 includes a bus 1005, a processor 1010, a system memory 1015, a read-only memory 1020, a permanent storage device 1025, input devices 1030, and output devices 1035.

The bus 1005 collectively represents all system, peripheral, and chipset buses that support communication among internal devices of the computer system 1000. For instance, the bus 1005 communicatively connects the processor 1010 with the read-only memory 1020, the system memory 1015, and the permanent storage device 1025.

From these various memory units, the processor 1010 retrieves instructions to execute and data to process in order to execute the processes of the invention. In some embodiments the processor comprises a Field Programmable Gate Array (FPGA), an ASIC, or various other electronic components for executing instructions. The read-only-memory (ROM) 1020 stores static data and instructions that are needed by the processor 1010 and other modules of the computer system. The permanent storage device 1025, on the other hand, is a read-and-write memory device. This device is a non-volatile memory unit that stores instruction and data even when the computer system 1000 is off. Some embodiments of the invention use a mass-storage device (such as a magnetic or optical disk and its corresponding disk drive) as the permanent storage device 1025. Some embodiments use one or more removable storage devices (flash memory card or memory stick) as the permanent storage device.

Like the permanent storage device 1025, the system memory 1015 is a read-and-write memory device. However, unlike storage device 1025, the system memory is a volatile read-and-write memory, such as a random access memory. The system memory stores some of the instructions and data that the processor needs at runtime.

Instructions and/or data needed to perform processes of some embodiments are stored in the system memory 1015, the permanent storage device 1025, the read-only memory 1020, or any combination of the three. For example, the various memory units contain instructions for processing multimedia items in accordance with some embodiments. From these various memory units, the processor 1010 retrieves instructions to execute and data to process in order to execute the processes of some embodiments.

The bus 1005 also connects to the input and output devices 1030 and 1035. The input devices enable the user to communicate information and select commands to the computer system. The input devices 1030 include alphanumeric keyboards and cursor-controllers. The output devices 1035 display images generated by the computer system. The output devices include printers and display devices, such as cathode ray tubes (CRT) or liquid crystal displays (LCD). Finally, as shown in FIG. 10, bus 1005 also couples computer 1000 to a network 1065 through a network adapter (not shown). In this manner, the computer can be a part of a network of computers (such as a local area network ("LAN"), a wide area network ("WAN"), or an Intranet) or a network of networks (such as the Internet).

It should be recognized by one of ordinary skill in the art that any or all of the components of computer system 1000 may be used in conjunction with the invention. For instance, some or all components of the computer system described with regards to FIG. 10 comprise some embodiments of the UE, FAP, GANC, and GGSN described above. Moreover, one of ordinary skill in the art will appreciate that any other system configuration may also be used in conjunction with the invention or components of the invention.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. For example, data services have been described with respect to text messaging, instant messaging, mobile Internet access, email, and the like. However one of ordinary will realize that any service utilizing data services of a licensed wireless core network (e.g., GPRS) is similarly contained within the above description of data services.

Moreover, while the invention has been described with reference to numerous specific details, one of ordinary skill in the art will recognize that the invention can be embodied in other specific forms without departing from the spirit of the invention. For instance, specific details of one or more examples can be combined to provision user equipment. Various functionality of a traditional SGSN and TTG may or may not be included within the functionality of the GANC. The disclosed techniques can be used for an integrated system that includes licensed wireless communication systems other than GSM, GPRS, GERAN, or UTRAN or communication systems other than a UMAN. Moreover, the enumerated communication interfaces (e.g., A/Gb Iu-cs/Iu-ps) are presented as interfaces for certain embodiments of the present invention. It should be noted that any compatible communication interface with the ICS may similarly be adapted to provide the functionality described above.

Additionally, some embodiments of the ICS referred to user equipment of a licensed communication network. However, it should be apparent one of ordinary skill in the art that various other implementations of the ICS, such as the femtocell architecture described with regards to FIG. 2, and any associated or compatible user equipment is adaptable to provide the location based services described above. Moreover, certain terms as disclosed may be used interchangeably without diverging from the spirit of the invention.

In some examples and diagrams, two components may be described or shown as connected to each other. The connection may be a direct wire connection or the two components may be communicatively coupled to each other through other components or through wireless or broadband links. Thus, one of ordinary skill in the art would understand that the invention is not to be limited by the foregoing illustrative details, but rather is to be defined by the appended claims.

APPENDIX I

Table of Acronyms

| | |
|---|---|
| AAA | Authorization, Authentication, and Accounting |
| AP | Access Point |
| APN | Access Point Name |
| ASIC | Application-Specific Integrated Circuit |
| BCCH | Broadcast Channel Control |
| BSC | Base Station Controller |
| BSS | Base Station Subsystem |
| BSSGP | Base Station Subsystem GPRS Protocol |
| BTS | Base Transceiver Station |
| CGI | Cell Global Identification |
| CRT | Cathode Ray Tube |
| EDGE | Enhanced Data Rates for GSM Evolution |
| FAP | Femtocell Access Point |
| GA-PSR | Generic Access Packet Switched Resources |
| GAN | Generic Access Network |

APPENDIX I-continued

Table of Acronyms

| | |
|---|---|
| GANC | Generic Access Network Controller |
| GERAN | GSM EDGE Radio Access Network |
| GGSN | Gateway GPRS Support Node |
| GPRS | General Packet Radio Service |
| GSM | Global System for Mobile Communication |
| GTP | GPRS Tunneling Protocol |
| GTP-U | GPRS Tunneling Protocol-User |
| HLR | Home Location Register |
| ICS | Integrated Communication System |
| IMSI | International Mobile Subscriber Identity |
| INC | IP Network Controller |
| IP | Internet Protocol |
| IPTC | Internet Protocol Transport Channel |
| ISDN | Integrated Services Digital Network |
| IT | Information Technology |
| I-WLAN | Interworking Wireless Local Area Network |
| LAN | Local Area Network |
| LCD | Liquid Crystal Display |
| LCS | Location Services |
| LLC | Logical Link Control |
| MAC | Media Access Control |
| MSC | Mobile Switching Center |
| MSISDN | Mobile Station International ISDN Number |
| OSI | Open System Interconnection |
| PDG | Packet Data Gateway |
| PDN | Packet Data Network |
| PDP | Packet Data Protocol |
| PLD | Programmable Logic Device |
| PLMN | Public Land Mobile Network |
| POTS | Plain Old Telephone Service |
| QoS | Quality of Service |
| RAM | Random Access Memory |
| RAN | Radio Access Network |
| RANAP | Radio Access Network Application Part |
| RNC | Radio Network Controller |
| ROM | Read Only Memory |
| SeGW | Security Gateway |
| SGSN | Serving GPRS Support Node |
| SIM | Subscriber Identity Mobile |
| SIP | Session Initiation Protocol |
| SMS | Short Message Service |
| SSID | Service Set Identifier |
| TTG | Terminal Tunnel Gateway |
| UDP | User Datagram Protocol |
| UE | User Equipment |
| UMTS | Universal Mobile Telecommunication System |
| UMA | Universal Mobile Access |
| UNC | Universal Network Controller |
| UTRAN | UMTS Terrestrial Radio Access Network |
| VoIP | Voice Over IP |
| WAN | Wide Area Network |
| WLAN | Wireless Local Area Network |
| WAG | Wireless Access Gateway |
| WiMAX | Worldwide Interoperability for Microwave Access |
| WLAN | Wireless Local Area Network |

APPENDIX II

Listing of Cited References

3GPP TS 23.234, "3GPP System to Wireless Local Area Network (WLAN) Interworking" (Release 6, June 2005)

What is claimed is:

1. A method of providing packet switched data services in a communication system comprising a first communication system and a second communication system, the first communication system comprising a licensed radio access network and a core network comprising a Gateway General Packet Radio Service (GPRS) Support Node (GGSN) for interfacing to a packet services network and a Serving GPRS Support Node (SGSN) for interfacing the licensed radio access network to the GGSN, the second communication system comprising a network controller that communicatively couples a user equipment in a service region of the second communication system to the core network of the first communication system, the method comprising:
- establishing a secure tunnel between the network controller and the user equipment;
- receiving a data service session request from the user equipment over the secure tunnel;
- establishing a GPRS Tunneling Protocol (GTP) tunnel between the network controller and the GGSN, the GTP tunnel bypassing the SGSN, the network controller emulating the SGSN to the GGSN; and
- through the GTP tunnel, providing packet switched data services of the packet services network to the user equipment.

2. The method of claim 1 further comprising establishing a plurality of GTP tunnels between the network controller and the GGSN.

3. The method of claim 1, wherein providing the packet switched data services comprises relaying data packets received from the GGSN to the user equipment through the network controller, wherein relaying the data packets comprises forwarding the data packets from the network controller to the user equipment without modifying said data packets.

4. The method of claim 1, wherein providing the packet switched data services comprises relaying data packets received from the user equipment through the network controller to the GGSN.

5. The method of claim 4, wherein the data packets that are sent from the user equipment identify the GGSN as a destination.

6. The method of claim 4, wherein relaying the data packets comprises forwarding the data packets from the network controller to the GGSN without modifying said data packets.

7. The method of claim 4, wherein the GGSN routes said data packets to the packet services network.

8. A computer readable storage medium storing computer program for execution by a network controller of a first communication system in a communication system comprising the first communication system and a second communication system, the second communication system comprising a licensed radio access network and a core network comprising a Gateway General Packet Radio Service (GPRS) Support Node (GGSN) for interfacing to a packet services network and a Serving GPRS Support Node (SGSN) for interfacing the licensed radio access network to the GGSN, the computer program comprising sets of instructions for:
- establishing a secure tunnel between the network controller and a user equipment;
- receiving a data service session request from the user equipment over the secure tunnel;
- establishing at least one GPRS Tunneling Protocol (GTP) tunnel between the network controller and the GGSN, the GTP tunnel bypassing the SGSN, the network controller emulating the SGSN to the GGSN; and
- providing, through the GTP tunnel, packet switched data services of the packet services network to the user equipment.

9. The computer readable storage medium of claim 8 wherein the computer program further comprises a set of instructions for providing circuit switched voice services for the user equipment through a switching center of the core network of the second communication system.

10. The computer readable storage medium of claim 8, wherein the computer program further comprises a set of instructions for establishing a plurality of GTP tunnels between the network controller and the GGSN.

11. The computer readable storage medium of claim 8, wherein the set of instructions for providing the packet switched data services comprises a set of instructions for relaying Internet Protocol (IP) data packets from the user equipment to the GGSN.

12. The computer readable storage medium of claim 11, wherein relaying the IP data packets does not require modifying said IP data packets.

* * * * *